United States Patent
Ishii

(10) Patent No.: US 11,903,070 B2
(45) Date of Patent: Feb. 13, 2024

(54) METHODS AND APPARATUS FOR USING REDUNDANT LINKS IN WIRELESS BACKHAUL

(71) Applicants: SHARP KABUSHIKI KAISHA, Sakai (JP); FG Innovation Company Limited, Tuen Mun (HK)

(72) Inventor: Atsushi Ishii, Osaka (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 366 days.

(21) Appl. No.: 17/289,940

(22) PCT Filed: Oct. 31, 2019

(86) PCT No.: PCT/JP2019/042851
§ 371 (c)(1),
(2) Date: Apr. 29, 2021

(87) PCT Pub. No.: WO2020/090987
PCT Pub. Date: May 7, 2020

(65) Prior Publication Data
US 2022/0015176 A1 Jan. 13, 2022

Related U.S. Application Data

(60) Provisional application No. 62/753,715, filed on Oct. 31, 2018.

(51) Int. Cl.
*H04W 76/19* (2018.01)
*H04W 76/15* (2018.01)
(Continued)

(52) U.S. Cl.
CPC .......... *H04W 76/19* (2018.02); *H04W 24/04* (2013.01); *H04W 76/15* (2018.02); *H04W 84/047* (2013.01); *H04W 92/10* (2013.01)

(58) Field of Classification Search
None
See application file for complete search history.

(56) References Cited

U.S. PATENT DOCUMENTS

| 11,076,306 | B2 * | 7/2021 | Hampel | ............ H04B 7/15528 |
| 2017/0170941 | A1 | 6/2017 | Yang et al. | |

(Continued)

FOREIGN PATENT DOCUMENTS

| CN | 102217354 A | 10/2011 |
| CN | 105960772 A | 9/2016 |
| CN | 108282823 A | 7/2018 |

OTHER PUBLICATIONS

Samsung, "IAB Topology and Route Management", 3GPP TSG-RAN WG2 #103 Gothenburg, Sweden, Aug. 20-24, 2018, R2-1811998.

(Continued)

*Primary Examiner* — Brian S Roberts
(74) *Attorney, Agent, or Firm* — ScienBiziP, P.C.

(57) ABSTRACT

A wireless access node of a radio access network (RAN) that communicates over a radio interface with a wireless terminal. The wireless access node comprises transmitter circuitry and receiver circuitry. The transmitter circuitry is configured to transmit at least one message to the wireless terminal. The at least one message is configured to activate a first signaling data path and a second signaling data path. The first signaling data path and the second signaling data path are established between the wireless access node and the wireless terminal. Signaling data on the first signaling data path is relayed by a wireless relay node.

12 Claims, 24 Drawing Sheets

(51) Int. Cl.
*H04W 24/04* (2009.01)
*H04W 84/04* (2009.01)
*H04W 92/10* (2009.01)

(56) References Cited

U.S. PATENT DOCUMENTS

| | | | |
|---|---|---|---|
| 2018/0278357 | A1 | 9/2018 | Kim et al. |
| 2019/0215756 | A1* | 7/2019 | Park ................. H04W 76/27 |
| 2019/0327660 | A1* | 10/2019 | Hong ................ H04W 40/38 |
| 2020/0092784 | A1* | 3/2020 | Hampel ........... H04B 7/15528 |
| 2021/0105795 | A1* | 4/2021 | Zhu .................. H04W 72/542 |

OTHER PUBLICATIONS

Lenovo, Motorola Mobility, "Initial link selection for IAB access", 3GPP TSG-RAN WG2 Meeting #103 Gothenburg, Sweden, Aug. 20-24, 2018, R2-1812056.

Lenovo, Motorola Mobility, "Considerations on IAB multi-hop system", 3GPP TSG-RAN WG2 Meeting #103 Gothenburg, Sweden, Aug. 20-24, 2018, R2-1812061.

Lenovo, Motorola Mobility, "Radio link failure of backhaul link", 3GPP TSG-RAN WG2#103 Meeting Gothenburg, Sweden, Aug. 20-24, 2018, R2-1812069.

Ericsson, "The consequences of not using SCTP/IP for F1-AP transport", 3GPP TSG-RAN WG2 #103 Gothenburg, Sweden, Aug. 20-24, 2018, R2-1812219.

Ericsson, "Setup Procedure for the Adaptation Layer of an IAB network", 3GPP TSG-RAN WG2 #103 Gothenburg, Sweden, Aug. 20-24, 2018, R2-1812220.

Nokia, Nokia Shanghai Bell, "IAB Topology Discovery for Routing and Topology Management", 3GPP TSG-RAN WG2 Meeting #103 Gothenburg, Sweden, Aug. 20-24, 2018, R2-1812300.

Nokia, Nokia Shanghai Bell, "Measurements for IAB", 3GPP TSG-RAN WG2 Meeting #103 Gothenburg, Sweden, Aug. 20-24, 2018, R2-1812301.

Nokia, Nokia Shanghai Bell, "Service interruption time minimization for backhaul links", 3GPP TSG-RAN WG2 Meeting #103 Gothenburg, Sweden, Aug. 20-24, 2018, R2-1812302.

Nokia et al, "Topology Adaptation Scenarios", 3GPP TSG-RAN WG2 Meeting #103 Gothenburg, Sweden, Aug. 20-24, 2018, R2-1812341.

Nokia, Nokia Shanghai Bell, "IAB Routing for Architecture 2a", 3GPP TSG-RAN WG2 Meeting #103 Gothenburg, Sweden, Aug. 20-24, 2018, R2-1812346.

AT&T, "Route Changes Based on Intra-gNB Handover of IAB Node", 3GPP TSG-RAN WG2 Meeting #103 Gothenburg, Sweden, Aug. 20-24, 2018, R2-1812405.

ZTE, "Discussion on IAB link switch and topology adaptation", 3GPP TSG-RAN WG2#103 Gothenburg, Sweden, Aug. 20-24, 2018, R2-1812467.

ZTE, "Discussion on IAB node discovery and selection", 3GPP TSG-RAN WG2#103 Gothenburg, Sweden, Aug. 20-24, 2018, R2-1812468.

ZTE, "Discussion on UE bearer setup proceudre for IAB network", 3GPP TSG-RAN WG2#103 Gothenburg, Sweden, Aug. 20-24, 2018, R2-1812464.

ZTE, "Consideration on Routing in IAB Architecture 1a and 1b", 3GPP TSG-RAN WG2 #103 Gothenburg, Sweden, Aug. 20-24, 2018, R2-1812469.

ZTE, "Control plane signaling delivery in NSA deployment", 3GPP TSG-RAN WG2 Meeting #103 Gothenburg, Sweden, Aug. 20-24, 2018, R2-1812470.

KT Corp, "Topology management for IAB", 3GPP TSG-RAN WG2#103 Gothenburg, Sweden, Aug. 20-24, 2018, R2-1812522.

AT&T, "Establishment of RLC Channels During and After IAB Node Integration for Architecture Group 1", 3GPP TSG-RAN WG2 Meeting #103 Gothenburg, Sweden, Aug. 20-24, 2018, R2-1812404.

ZTE, "Discussion on IAB link switch and topology adaptation", R3-184760, 3GPP TSG-RAN WG3#101, Gothenburg, Sweden, Aug. 20-24, 2018.

Lenovo et al., "Radio link failure in backhaul link", R2-1814501, 3GPP TSG-RAN WG2 Meeting #103bis, Chengdu, China, Oct. 8-12, 2018.

Qualcomm Incorporated, Ericsson, AT&T, "IAB backhaul RLF recovery for architecture 1a", R3-185522, 3GPP TSG-RAN WG3 Meeting #101bis, Chengdu, China, Oct. 8-12, 2018, chapters 2.1, 2.2, 9 x,y, 9.x.y+1.

3rd Generation Partnership Project; Technical Specification Group Radio Access Network; Study on Integrated Access and Backhaul; (Release 15); 3GPP TR 38.874 V0.5.0 (Oct. 2018), chapters 6.1.2, 9.7.7-9.7.10, 8.2.4.1, 9.2.

3rd Generation Partnership Project; Technical Specification Group Radio Access Network; Evolved Universal Terrestrial Radio Access (E-UTRA) and NR; Multi-connectivity; Stage 2 (Release 15); 3GPP TS 37.340 V15.3.0 (Sep. 2018), chapters 7.7, 10.2, 10.3, 3, 4, 8.

3GPP TS 37.324, "3rd Generation Partnership Project; Technical Specification Group Radio Access Network; E-UTRA and NR; Service Data Adaptation Protocol (SDAP) specification (Release 15)", V15.1.0 (Sep. 2018).

3GPP TS 36.213, "3rd Generation Partnership Project; Technical Specification Group Radio Access Network; Evolved Universal Terrestrial Radio Access (E-UTRA); Physical layer procedures (Release 16)", V16.0.0 (Dec. 2019).

3GPP TS 38.321, "3rd Generation Partnership Project; Technical Specification Group Radio Access Network; NR; Medium Access Control (MAC) protocol specification (Release 16)", V16.0.0 (Mar. 2020).

3GPP TS 38.213, "3rd Generation Partnership Project; Technical Specification Group Radio Access Network; NR; Physical layer procedures for control (Release 16)", V16.1.0 (Mar. 2020).

3GPP TS 38.214, "3rd Generation Partnership Project; Technical Specification Group Radio Access Network; NR; Physical layer procedures for data (Release 16)", V16.1.0 (Mar. 2020).

3GPP TS 38.331, "3rd Generation Partnership Project; Technical Specification Group Radio Access Network; NR; Radio Resource Control (RRC) protocol specification (Release 16)", V16.1.0 (Jul. 2020).

3GPP TS 38.300, "3rd Generation Partnership Project; Technical Specification Group Radio Access Network; NR; NR and NG-RAN Overall Description; Stage 2 (Release 15)", V15.3.1 (Oct. 2018).

Samsung, "On the ST and DAG topologies for IAB", 3GPP TSG-RAN WG2 Meeting #103 Gothenburg, Sweden, Aug. 20-24, 2018, R2-1811058.

Samsung, "Control plane data mapping for Architecture 1a", 3GPP TSG-RAN WG2 Meeting #103 Gothenburg, Sweden, Aug. 20-24, 2018, R2-1811169.

Samsung, "F1AP mapping options for IAB", 3GPP TSG-RAN WG2 Meeting #103 Gothenburg, Sweden, Aug. 20-24, 2018, R2-1811170.

Sony, "Route management in IAB", 3GPP TSG RAN WG2 Meeting #103 Gothenburg, Sweden, Aug. 20-24, 2018, R2-1811418.

3GPP TS 38.323, "3rd Generation Partnership Project; Technical Specification Group Radio Access Network; NR; Packet Data Convergence Protocol (PDCP) specification (Release 15)", V15.3.0 (Sep. 2018).

3GPP TS 38.322, "3rd Generation Partnership Project; Technical Specification Group Radio Access Network; NR; Radio Link Control (RLC) protocol specification (Release 15)", V15.3.0 (Sep. 2018).

3GPP TS 38.473, "3rd Generation Partnership Project; Technical Specification Group Radio Access Network; NG-RAN; F1 application protocol (F1AP) (Release 15)", V15.3.0 (Sep. 2018).

3GPP TS 38.331, "3rd Generation Partnership Project; Technical Specification Group Radio Access Network; NR; Radio Resource Control (RRC) protocol specification (Release 15)", V15.3.0 (Sep. 2018).

Sony, "Open issues related to IAB power on procedure", 3GPP TSG RAN WG2 Meeting# 103 Gothenburg, Sweden, Aug. 20-24, 2018, R2-1811419.

(56) References Cited

OTHER PUBLICATIONS

Vivo, "IAB Topology and Routing Management", 3GPP TSG-RAN WG2 Meeting #103 Gothenburg, Sweden, Aug. 20-24, 2018, R2-1811778.

Vivo, "Selection of Parent for IAB-Node", 3GPP TSG-RAN WG2 Meeting #103 Gothenburg, Sweden, Aug. 20-24, 2018, R2-18011779.

Kyocera, "Consideration of topology adaptation in IAB", 3GPP TSG-RAN WG2 #103 Gothenburg, Sweden, Aug. 20-24, 2018, R2-1811843.

Huawei, "Destination Address and Forwarding Path based Routing for IAB", 3GPP TSG-RAN WG2 Meeting #103 Gothenburg, Sweden, Aug. 20-24, 2018, R2-1812892.

Huawei, "Support of Multiple connectivity and fast link switch for IAB", 3GPP TSG-RAN WG2 #103 Gothenburg, Sweden, Aug. 20-24, 2018, R2-1812893.

Potevio, "The mobility in IAB", 3GPP TSG-RAN WG2 Meeting #103 Gothenburg, Sweden, Aug. 20-24, 2018, R2-1812673.

LG Electronics Inc, "Discussion for routing operation of IAB topologies", 3GPP TSG-RAN WG2 #103 Gothenburg, Sweden, Aug. 20-24, 2018, R2-1812682.

ITRI, "Discussion on IAB topology adaptation with Tree and DAG", 3GPP TSG-RAN WG2 Meeting #103 Gothenburg, Sweden, Aug. 20-24, 2018, R2-1812708.

LG Electronics Inc, "Consideration on route selection", 3GPP TSG-RAN WG2 Meeting #103 Gothenburg, Sweden, Aug. 20-24, 2018, R2-1812785.

LG Electronics Inc, "Consideration on cell reselection of IAB", 3GPP TSG-RAN WG2 Meeting #103 Gothenburg, Sweden, Aug. 20-24, 2018, R2-1812796.

Huawei, HiSilicon, "Bearer mapping for control plane signaling in BH", 3GPP TSG-RAN WG2 #103 Gothenburg, Sweden, Aug. 20-24, 2018, R2-1812819.

LG Electronics Inc, "Handling of the RLF on wireless backhaul link", 3GPP TSG-RAN2 Meeting RAN2#103 Gothenburg, Sweden, Aug. 20-24, 2018, R2-1812820.

LG Electronics Inc, "Access Control for IAB node", 3GPP TSG-RAN WG2 #103 Gothenburg, Sweden, Aug. 20-24, 2018, R2-1812827.

Huawei, "Distributed RRC functions for IAB", 3GPP TSG-RAN WG2 #103 Gothenburg, Sweden, Aug. 20-24, 2018, R2-1812830.

Huawei, "Basic principles for IAB topology adaptation", 3GPP TSG-RAN WG2 #103 Gothenburg, Sweden, Aug. 20-24, 2018, R2-1812833.

ASUSTeK, "Consideration on routing table update in IAB", 3GPP TSG-RAN WG2 Meeting #103 Gothenburg, Sweden, Aug. 20-24, 2018, R2-1812846.

LG Electronics Inc, "Supporting Prioritization of F1-AP message", 3GPP TSG-RAN WG2 Meeting #103 Gothenburg, Sweden, Aug. 20-24, 2018, R2-1812862.

Huawei, HiSilicon, "Control Plane protocols for architecture group 1", 3GPP TSG-RAN WG2 #103 Gothenburg, Sweden, Aug. 20-24, 2018, R2-1812885.

Huawei, "Consideration about the F1*-C", 3GPP TSG-RAN WG2#103 Gothenburg, Sweden, Aug. 20-24, 2018, R2-1812889.

Samsung, "IAB failure recovery as part of route management", 3GPP TSG-RAN WG2 #103 Gothenburg, Sweden, Aug. 20-24, 2018, R2-1811997.

LG Electronics Inc, "Handling of wireless backhaul link problem", 3GPP TSG-RAN WG2 Meeting #103 Gothenburg, Sweden, Aug. 20-24, 2018, R2-1812644.

\* cited by examiner

METHODS AND APPARATUS FOR USING REDUNDANT LINKS IN WIRELESS BACKHAUL

This Nonprovisional application claims priority under 35 U.S.C. § 119 on provisional Application No. 62/753,715 on Oct. 31, 2018, the entire contents of which are hereby incorporated by reference.

TECHNICAL FIELD

The technology relates to wireless communications, and particularly to radio architecture and operation for resolving problematic conditions on wireless backhaul links.

BACKGROUND ART

A radio access network typically resides between wireless devices, such as user equipment (UEs), mobile phones, mobile stations, or any other device having wireless termination, and a core network. Example of radio access network types includes the Global Radio Access Network (GRAN), Global System for Mobile communications (GSM) radio access network; the GSM EDGE Radio Access Network (GERAN), which includes EDGE packet radio services; Universal Terrestrial Radio Access Network (UTRAN), the Universal Mobile Telecommunication System (UMTS) radio access network; Evolved-UTRAN (E-UTRAN), which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNodeB (gNB) (for a NR technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 22, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. An ANG interface exists between 5GC and the base stations (i.e. gNB & ng-eNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

In some cellular mobile communication systems and networks, such as Long-Term Evolution (LTE) and New Radio (NR), a service area is covered by one or more base stations, where each of such base stations may be connected to a core network by fixed-line backhaul links (e.g., optical fiber cables). In some instances, due to weak signals from the base station at the edge of the service area, users tend to experience performance issues, such as: reduced data rates, high probability of link failures, etc. A relay node concept has been introduced to expand the coverage area and increase the signal quality. As implemented, the relay node may be connected to the base station using a wireless backhaul link.

In 3rd Generation Partnership Project (3GPP), the relay node concept for the fifth generation (5G) cellular system has been discussed and standardized, where the relay nodes may utilize the same 5G radio access technologies (e.g., New Radio (NR)) for the operation of services to User Equipment (UE) (access link) and connections to the core network (backhaul link) simultaneously. These radio links may be multiplexed in time, frequency, and/or space. This system may be referred to as Integrated Access and Backhaul (IAB).

Some such cellular mobile communication systems and networks may comprise IAB-donors and IAB-nodes, where an IAB-donor may provide interface to a core network to UEs and wireless backhauling functionality to IAB-nodes; and additionally, an IAB-node may provide IAB functionality combined with wireless self-backhauling capabilities. IAB-nodes may need to periodically perform inter-IAB-node discovery to detect new IAB-nodes in their vicinity based on cell-specific reference signals (e.g., Synchronization Signal and Physical Broadcast Channel (PBCH) block SSB). The cell-specific reference signals may be broadcasted on a PBCH where packets may be carried or broadcasted on the Master Information Block (MIB) section.

Demand for wireless traffic has increased significantly over time and IAB systems are expected to be reliable and robust against various kinds of possible failures. Considerations have been given for IAB backhaul design. In particular, to provide methods and procedures to address radio link failures on the backhaul link.

What is needed are methods, apparatus, and/or techniques to cope with unfavorable conditions or problems on a wireless backhaul link.

SUMMARY OF INVENTION

In one example, a wireless access node of a radio access network (RAN) that communicates over a radio interface with a wireless terminal, the wireless access node comprising: transmitter circuitry configured to transmit, to the wireless terminal, at least one reconfiguration message, the at least one reconfiguration message being configured to facilitate dual connectivity (DC) with a first connection and a second connection; processor circuitry configured to establish the first connection and the second connection with the wireless terminal, the first connection being relayed by a wireless relay node and; receiver circuitry configured to receive a failure information message from the wireless terminal using the second connection, wherein; the failure information message comprises information based on a notification message transmitted from the wireless relay node to the wireless terminal.

In one example, a method in a radio access network (RAN) that communicates over a radio interface with a wireless terminal, the method comprising transmitting at least one reconfiguration message, to the wireless terminal, the at least one reconfiguration message being configured to facilitate dual connectivity (DC) with a first connection and a second connection; establishing the first connection and the second connection with the wireless terminal, the first connection being relayed by a wireless relay node; and receiving a failure information message from the wireless terminal using the second connection, wherein the failure information message comprises information based on a notification message transmitted from the wireless relay node to the wireless terminal.

In one example, a wireless terminal that communicates over a radio interface with a wireless access node of a radio access network (RAN), the wireless terminal comprising receiver circuitry configured to receive, from the wireless access node, at least one reconfiguration message, the at least one reconfiguration message being configured to facilitate dual connectivity (DC) with a first connection and a second connection; processor circuitry configured to establish the first connection and the second connection with the wireless access node, the first connection being relayed by a wireless relay node; receiver circuitry configured to receive a notification message from the wireless relay node; and transmitter circuitry configured to transmit, based on a reception of the notification message, a failure information message to the wireless access node using the second connection.

In one example, a method for a wireless terminal that communicates over a radio interface with a wireless access node of a radio access network (RAN), the method comprising: receiving, from the wireless access node, at least one reconfiguration message, the at least one reconfiguration message being configured to facilitate dual connectivity (DC) with a first connection and a second connection; establishing the first connection and the second connection with the wireless access node, the first connection being relayed by a wireless relay node; receiver circuitry configured to receive a notification message from the wireless relay node; and transmitting, based on a reception of the notification message, a failure information message to the wireless access node using the second connection.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DESCRIPTION OF EMBODIMENTS

Figure 1:
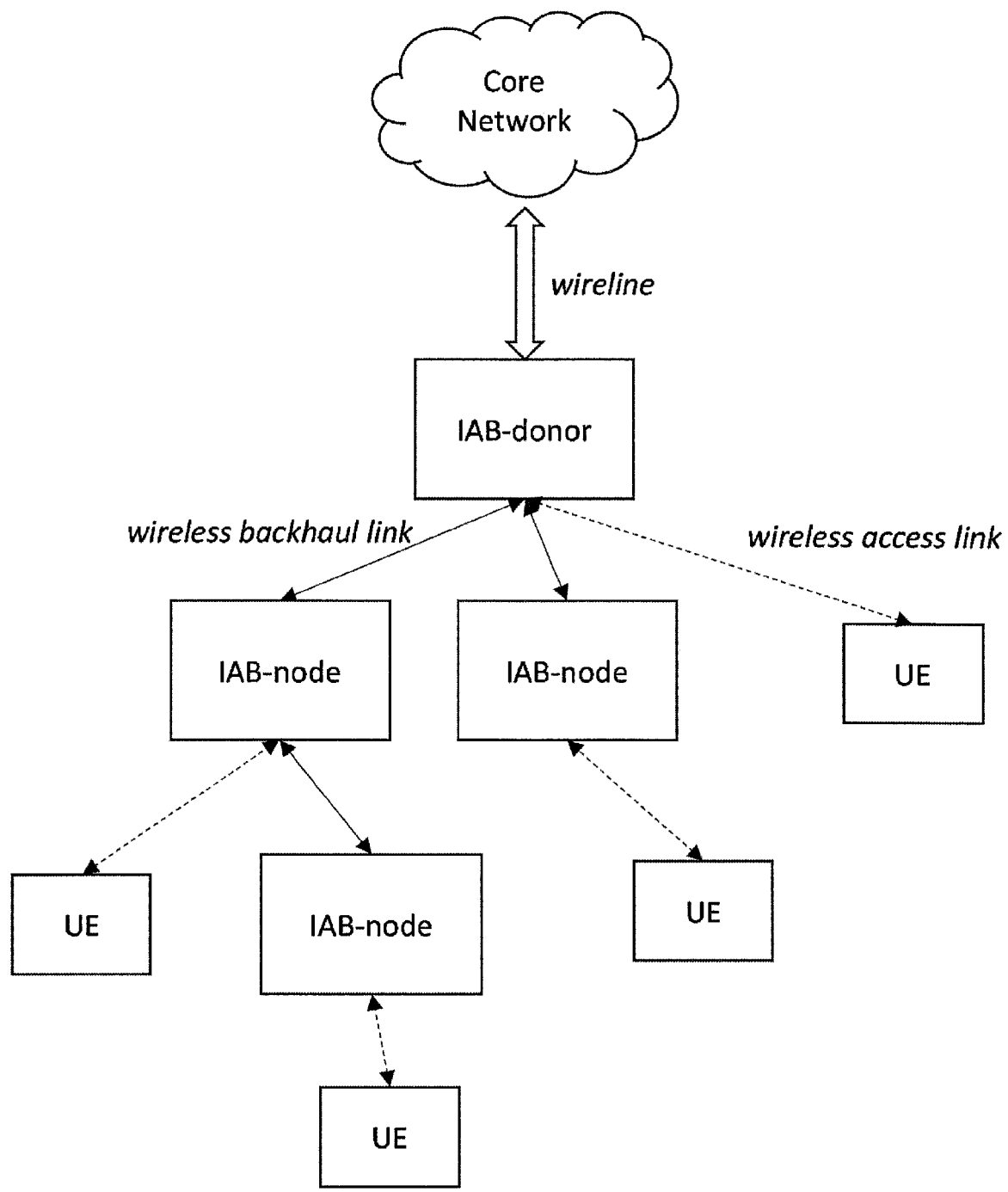
FIG. 1 is a diagrammatic view illustrating a mobile network infrastructure using 5G signals and 5G base stations.

In one of its example aspects, the technology disclosed herein concerns a wireless access node of a radio access network (RAN) that communicates over a radio interface with a wireless terminal. In an example embodiment and mode the wireless access node comprises transmitter circuitry and receiver circuitry. The transmitter circuitry is configured to transmit at least one message to the wireless terminal. The at least one message is configured to activate a first signaling data path and a second signaling data path. The first signaling data path and the second signaling data path are established between the wireless access node and the wireless terminal. Signaling data on the first signaling data path is relayed by a wireless relay node. Methods in such a wireless access node are also provided.

In another of its example aspects, the technology disclosed herein concerns a wireless terminal that communicates over a radio interface with a wireless access node of a radio access network (RAN). The wireless terminal comprises receiver circuitry, processor circuitry, and transmitter circuitry. The receiver circuitry is configured to receive from the wireless access node at least one message. The at least one message is configured to activate a first signaling data path and a second signaling data path. The first signaling data path and the second signaling data path are established between the wireless access node and the wireless terminal. The signaling data on the first signaling data path is relayed by a wireless relay node. The processor circuitry is configured to process a notification received from the wireless relay node. The transmitter circuitry is configured to transmit, based on a reception of the notification, a report message to the wireless access node. The report message comprises information based on the notification, and the notification is based on a radio condition detected on the first signaling data path. Methods in such a wireless terminal are also provided.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information. An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, the backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

In some aspects of the embodiments for handling of radio link failures in wireless relay networks, disclosed is a Mobile Termination (MT) functionality-typically provided by the User Equipment (UE) terminals—that may be implemented by Base Transceiver Stations (BTSs or BSs) nodes, for example, IAB nodes. In one embodiment, the MT functions may comprise common functions such as: radio transmission and reception, encoding and decoding, error detection and correction, signaling, and access to a SIM.

In a mobile network, an IAB child node may use the same initial access procedure (discovery) as an access UE to establish a connection with an IAB node/donor or parent-thereby attaching to the network or camping on a cell. In one embodiment, Radio Resource Control (RRC) protocol may be used for signaling between 5G radio network and UE, where RRC may have at least two states (e.g., RRC_IDLE and RRC_CONNECTED) and state transitions. The RRC sublayer may enable establishing of connections based on the broadcasted system information and may also include a security procedure. The U-Plane may comprise of PHY, MAC, RLC and PDCP layers.

Embodiments of the present system disclose methods and devices for an IAB-node to inform child nodes and/or UEs of upstream radio conditions and accordingly, the term IAB-node may be used to represent either a parent IAB-node or a child IAB-node, depending on where the IAB-node is in the network communication with the IAB-donor which is responsible for the physical connection with the core network. Embodiments are disclosed where an IAB-node (child IAB-node) may follow the same initial access procedure as a UE, including cell search, system information acquisition, and random access, in order to initially set up a connection to a parent IAB-node or an IAB-donor. That is, when an IAB base station (eNB/gNB) needs to establish a backhaul connection to, or camp on, a parent IAB-node or an IAB-donor, the IAB-node may perform the same procedures and steps as a UE, where the IAB-node may be treated as a UE but distinguished from a UE by the parent IAB-node or the IAB-donor.

In the disclosed embodiments for handling radio link failures in wireless relay networks, MT functionality-typically offered by a UE-may be implemented on an IAB-node. In some examples of the disclosed systems, methods, and device embodiments, consideration may be made in order for a child IAB-node to monitor a radio condition on a radio link to a parent IAB-node—where the parent IAB-node may itself be a child IAB-node in communication with an IAB-donor.

FIG. 1 is a diagrammatic view illustrating a mobile network infrastructure using 5G signals and 5G base stations. With reference to FIG. 1, the present embodiments include a mobile network infrastructure using 5G signals and 5G base stations (or cell stations). Depicted is a system diagram of a radio access network utilizing IAB nodes, where the radio access network may comprise, for example, one IAB-donor and multiple IAB-nodes. Different embodiments may comprise different number of IAB-donor and IAB-node ratios. Herein, the IAB nodes may be referred to as IAB relay nodes. The IAB-node may be a Radio Access Network (RAN) node that supports wireless access to UEs and wirelessly backhauls the access traffic. The IAB-donor may be a RAN node which may provide an interface to the core network to UEs and wireless backhauling functionality to IAB nodes. An IAB-node/donor may serve one or more IAB nodes using wireless backhaul links as well as UEs using wireless access links simultaneously. Accordingly, network backhaul traffic conditions may be implemented based on the wireless communication system to a plurality of IAB nodes and UEs.

With further reference to FIG. 1, a number of UEs are depicted in communication with IAB nodes, for example, IAB nodes and IAB donor node, via wireless access link. Additionally, the IAB-nodes (child nodes) may be in communication with other IAB-nodes and/or an IAB-donor (all of which may be considered IAB parent nodes) via wireless backhaul link. For example, a UE may be connected to an IAB-node which itself may be connected to a parent IAB-node in communication with an IAB-donor, thereby extending the backhaul resources to allow for the transmission of backhaul traffic within the network and between parent and child for integrated access. The embodiments of the system provide for capabilities needed to use the broadcast channel for carrying information bit(s) (on the physical channels) and provide access to the core network.

Figure 2:
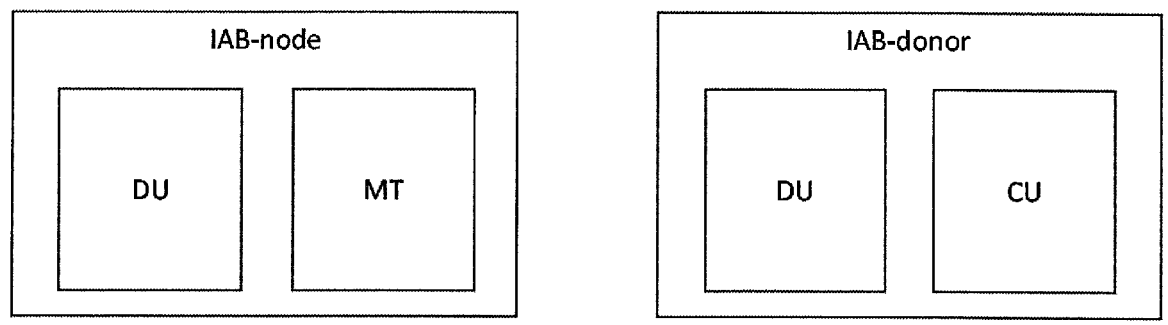
FIG. 2 is a diagrammatic view depicting an example of functional block diagrams for the IAB-donor and the IAB-node.

FIG. 2 is a diagrammatic view illustrating an example of functional block diagrams for the IAB-donor and the IAB-node (see FIG. 1). The IAB-donor may comprise at least one Central Unit (CU) and at least one Distributed Unit (DU). The CU is a logical entity managing the DU collocated in the IAB-donor as well as the remote DUs resident in the IAB-nodes. The CU may also be an interface to the core network, behaving as a RAN base station (e.g., eNB or gNB). In some embodiments, the DU is a logical entity hosting a radio interface (backhaul/access) for other child IAB-nodes and/or UEs. In one configuration, under the control of CU, the DU may offer a physical layer and Layer-2 (L2) protocols (e.g., Medium Access Control (MAC), Radio Link Control (RLC), etc.) while the CU may manage upper layer protocols (such as Packet Data Convergence Protocol (PDCP), Radio Resource Control (RRC), etc.). An IAB-node may comprise DU and Mobile-Termination (MT) functions, where in some embodiments the DU may have the same functionality as the DU in the IAB-donor, whereas MT may be a UE-like function that terminates the radio interface layers. As an example, the MT may function to perform at least one of: radio transmission and reception, encoding and decoding, error detection and correction, signaling, and access to a SIM.

Embodiments include a mobile network infrastructure where a number of UEs are connected to a set of IAB-nodes and the IAB-nodes are in communication with each other for relay and/or an IAB-donor using the different aspects of the present embodiments. In some embodiments, the UE may communicate with the CU of the IAB-donor on the C-Plane using RRC protocol and in other embodiments, using Service Data Adaptation Protocol (SDAP) and/or Packet Data Convergence Protocol (PDCP) radio protocol architecture for data transport (U-Plane) through NR gNB. In some embodiments, the DU of the IAB-node may communicate with the CU of the IAB-donor using 5G radio network layer signaling protocol: F1 Application Protocol (F1-AP*) which is a wireless backhaul protocol that provides signaling services between the DU of an IAB-node and the CU of an IAB-donor. That is, as further described below, the protocol stack configuration may be interchangeable, and different mechanism may be used.

Figure 3:
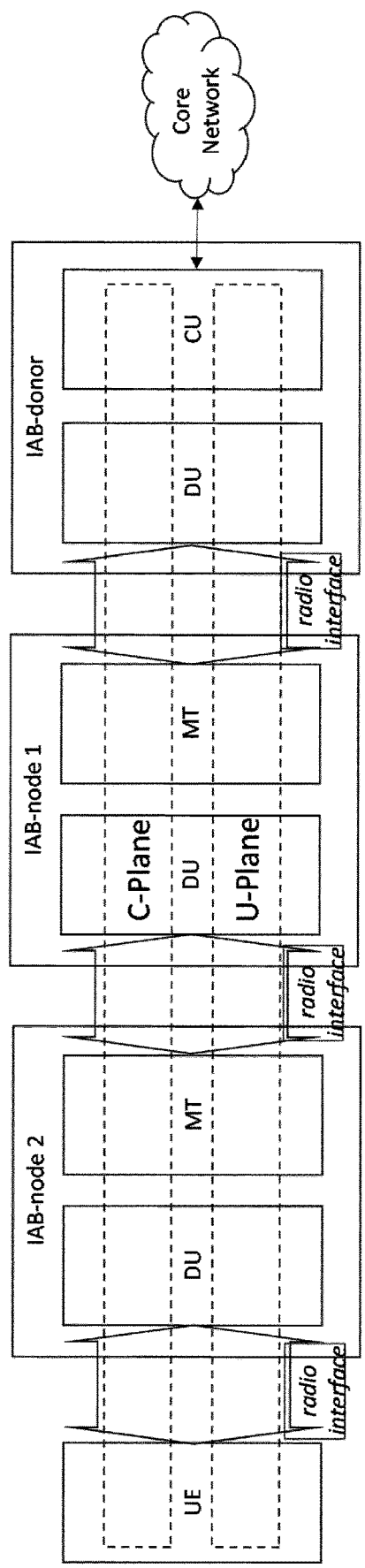
FIG. 3 is a diagrammatic view illustrating Control Plane (C-Plane) and User Plane (U-Plane) protocols among the UE, IAB-nodes, and IAB-donor.

FIG. 3 is a diagrammatic view illustrating Control Plane (C-Plane) and User Plane (U-Plane) protocols among the UE, IAB-nodes, and IAB-donor. As illustrated in FIG. 3, the protocols among the UE, IAB-nodes, and IAB donor are grouped into Control Plane (C-Plane) and User Plane (U-Plane). C-Plane carries control signals (signaling data), whereas the U-Plane carries user data. FIG. 3 illustrates an example of the embodiment where there are two IAB-nodes, IAB-node 1 and IAB-node 2, between the UE and the IAB-donor (two hops). Other embodiments may comprise a network with a single hop or multiple hops where there may be more than two IAB-nodes present.

Figure 4:
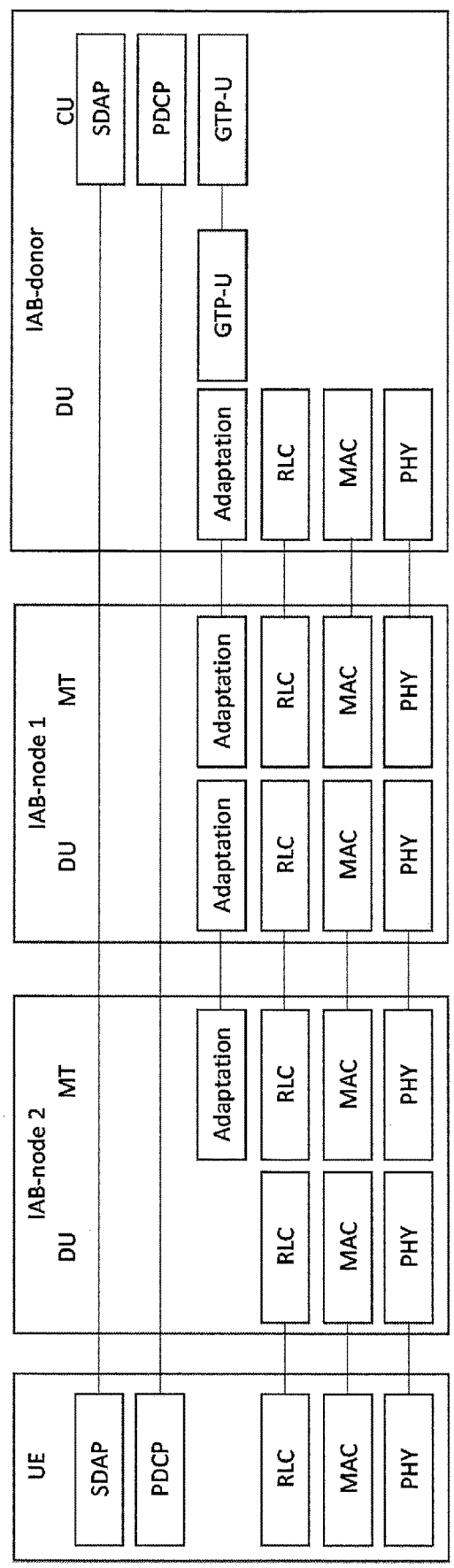
FIG. 4 is a functional block diagram of an example protocol stack configuration for the U-Plane.

FIG. 4 is a functional block diagram illustrating a protocol stack configuration for the U-Plane. As illustrated in FIG. 4, the stack comprises Service Data Protocol (e.g., SDAP, 3GPP TS 38.324) which may carry user data (e.g., via IP packets). In one embodiment, the SDAP runs on top of PDCP (3GPP TS 38.323) and the L2/Physical layers. In one embodiment, an Adaptation Layer is introduced between the IAB-node and the IAB-node/donor, where the Adaptation Layer carries relay-specific information, such as IAB-node/donor addresses, QoS information, UE identifiers, and potentially other information. In this embodiment, RLC (3GPP TS 38.322) may provide reliable transmission in a hop-by-hop manner while PDCP may perform end-to-end (UE-CU) error recovery. GTP-U (GPRS Tunneling Protocol User Plane) may be used for routing user data between CU and DU inside the IAB-donor.

Figure 5A:
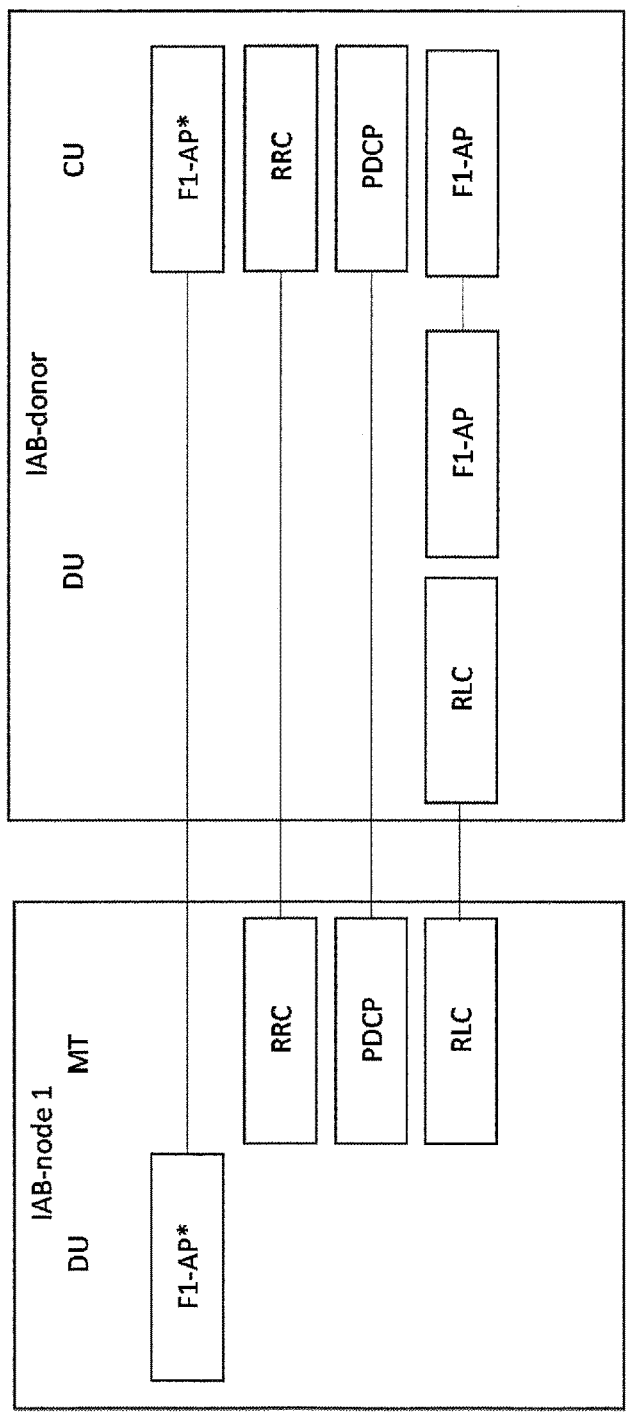
FIG. 5A depicts a functional block diagram of an example protocol stack configuration for the C-Plane between an IAB-node connected to an IAB-donor.

FIG. 5A illustrates a functional block diagram of an example protocol stack configuration for the C-Plane between an IAB-node (IAB-node 1) directly connected to an IAB-donor (via a single hop). As illustrated in FIG. 5A, the MT component of IAB-node 1 may establish an RRC connection with the CU component of the IAB-donor. In parallel, RRC may be used for carrying another signaling protocol in order for CU/IAB-donor to control the DU component resident in the IAB-node 1. In one embodiment, such a signaling protocol may be referred to as F1 Application Protocol* (F1-AP*), either the protocol referred as F1-AP specified in 3GPP TS 38.473 or a protocol based on the F1-AP with potential extended features to accommodate wireless backhauls (the original F1-AP is designed for wirelines). In other embodiments, F1-AP may be used for CU-DU connection inside the IAB-donor. It is assumed that below RLC, MAC/PHY layers are shared with the U-Plane.

Figure 5B:
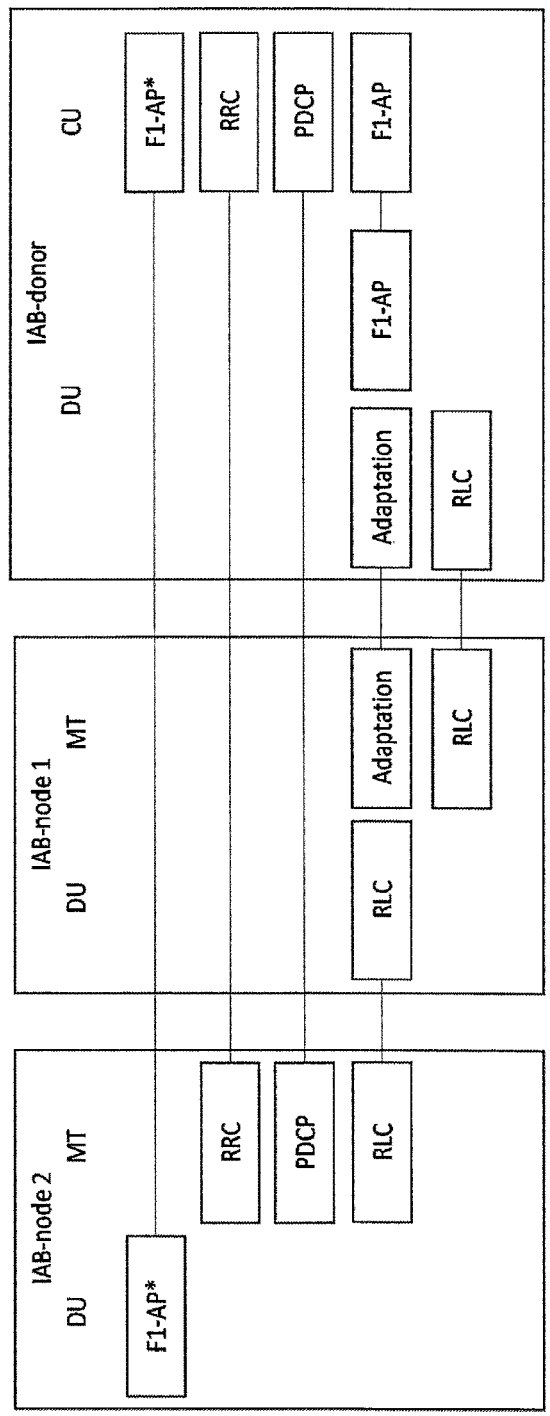
FIG. 5B depicts a functional block diagram of an example configuration of the C-Plane protocol stack for an IAB-node connected to another IAB-node which is connected to an IAB-donor.

FIG. 5B illustrates a functional block diagram of an example configuration of the C-Plane protocol stack for an IAB-node (IAB-node 2) connected to another IAB-node 1 which is connected to an IAB-donor (2 hops). As illustrated in FIG. 5B, it may be assumed that the IAB-node 1 has already established RRC/F1-AP* connections with the IAB-donor as illustrated in FIG. 5A. In IAB-node 1 the signaling bearer for IAB-node 2 RRC/PDCP may be carried by the Adaptation Layer to the IAB-donor. Similar to FIG. 5A, the F1-AP* signaling is carried by the RRC of IAB-node 2.

Figure 5C:
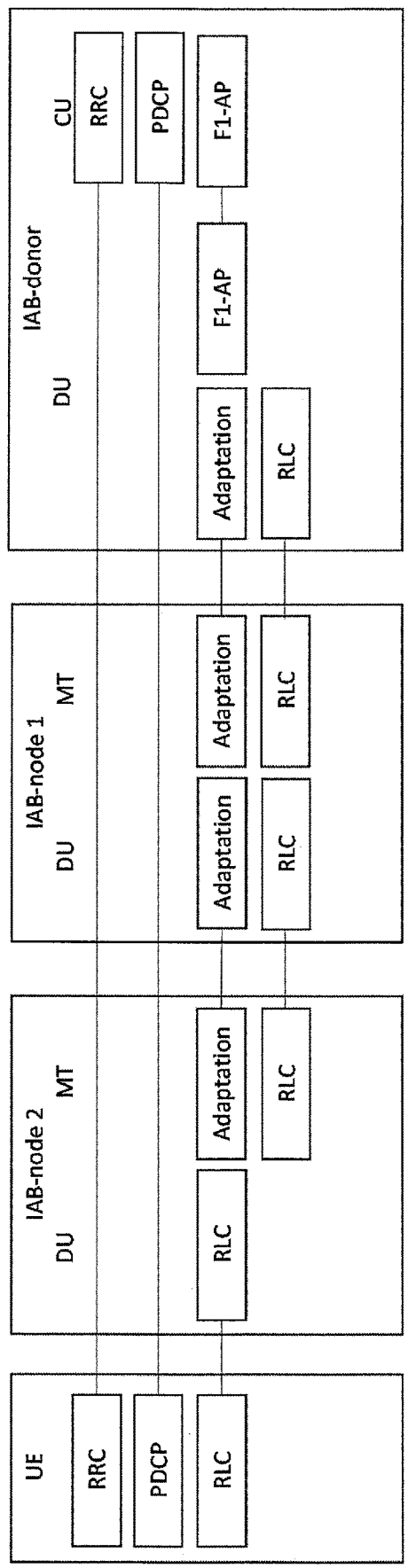
FIG. 5C depicts a functional block diagram of an example configuration of the C-Plane protocol stack for a UE's RRC signaling.

FIG. 5C depicts yet another functional block diagram of an example configuration of the C-Plane protocol stack for UE's RRC signaling under the 2-hop relay configuration shown in FIG. 5B. Accordingly, the UE having an MT component and functionality, via the C-Plane, may be connected to the CU of the IAB-donor. Though traffic is routed through IAB-node 2 and IAB-node 1, as depicted, the two nodes are passive nodes in that the data is passed to the next node(s) without manipulation. That is, data is transmitted by the UE to the node it is connected to, e.g., IAB-node 2, and then IAB-node 2 transmits the data to the node that is connected to, e.g., IAB-node 1, and then IAB-node 1 transmits the data (without manipulation) to the IAB-donor.

FIGS. 5A, 5B, and 5C illustrate that the MT of each IAB-node or UE has its own end-to-end RRC connection with the CU of the IAB-donor. Likewise, the DU of each IAB-node has an end-to-end F1-AP* connection with the CU of the IAB-donor. Any IAB nodes present between such end points transparently convey RRC or F1-AP signaling traffic.

Figure 6A:
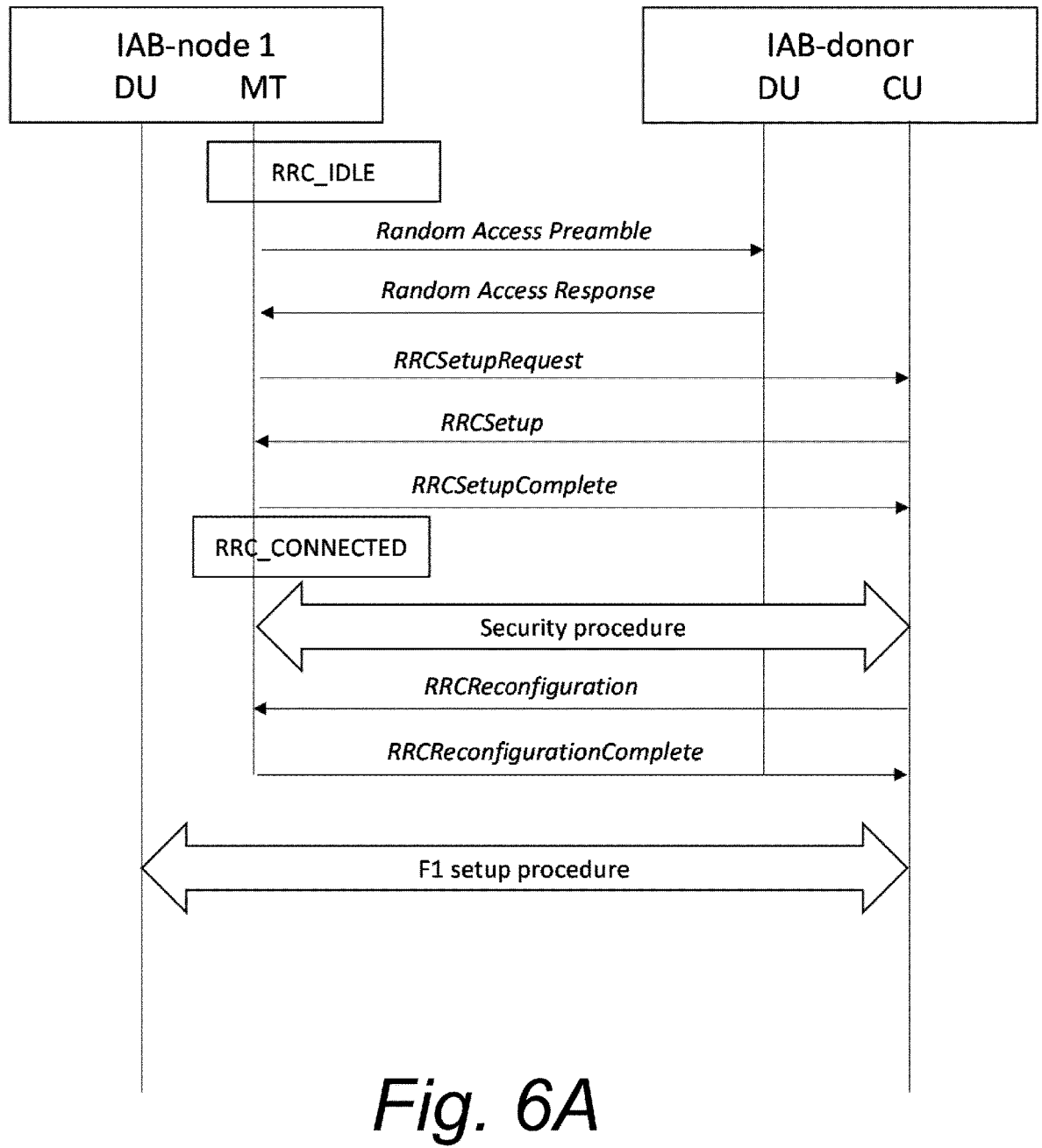
FIG. 6A depicts an example message sequence for an IAB-node to establish an RRC connection, followed by F1-AP* connection.
Figure 6B:
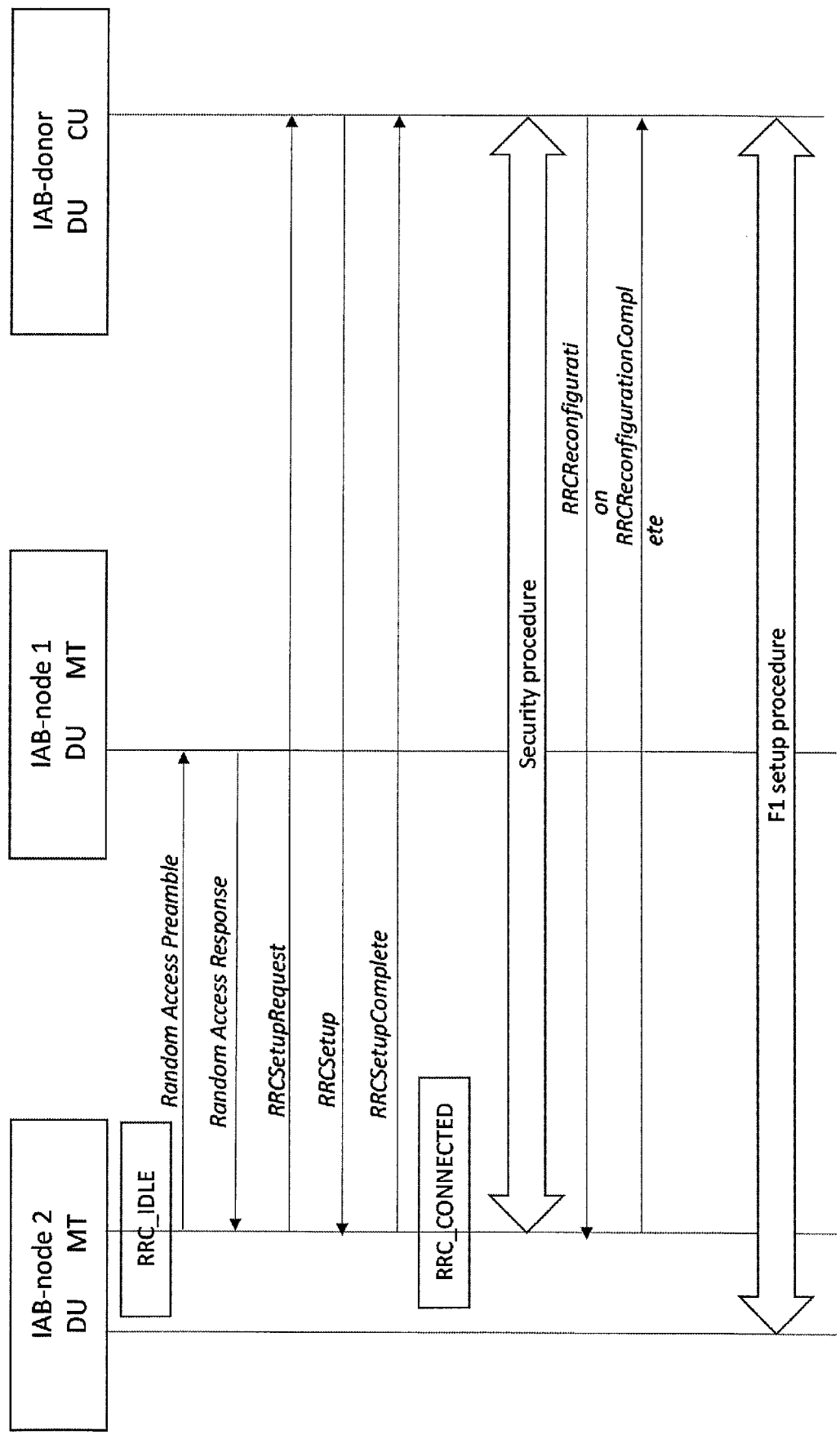
FIG. 6B depicts an example message sequence for IAB-node to establish an RRC connection with an IAB-donor, followed by the F1 setup procedure.

FIGS. 6A and 6B are diagrams of an example flow of information transmit/receive and/or processing by IAB-node(s) and an IAB-donor according to aspects of the present embodiments.

FIG. 6A illustrates an example message sequence for an IAB-node (IAB-node 1) to establish an RRC connection, followed by F1-AP* connection. It is assumed that IAB-node 1 has been pre-configured (or configured by the network) with information that instructs how to select a cell served by the IAB-donor. As shown in the figure, IAB-node 1—in an idle state (RRC_IDLE)-may initiate an RRC connection establishment procedure by sending Random Access Preamble to the IAB-donor, which may be received and processed by the DU of the IAB-donor. Upon successful reception of Random Access Response from the IAB-donor, IAB-node 1 may send a RRCSetupRequest, followed by reception of an RRCSetup and transmission of RRCSetupComplete. At this point of the message sequence, the IAB-node 1 may enter a connected state (RRC_CONNECTED) with the IAB-donor, and may proceed with a security procedure to configure encryption/integrity protection features. The CU of the IAB-donor may further send an RRCReconfiguration to IAB-node 1, which may comprise configuration parameters to configure radio bearers (e.g., data radio bearers (DRBs) and signaling radio bearers (SRBs)). In some embodiments, the RRCReconfiguration is sent to modify an RRC connection and establish Radio Connection between a UE and the network, however, in the present embodiment, the RRCReconfiguration may also be sent to configure a connection between an IAB-node and the network. RRC Connection Reconfiguration messages may be used to, for example, establish/modify/release Radio Bearers, and/or perform handover, etc. In one embodiment, any of the RRC messages transmitted from IAB-node 1 may include information identifying the IAB-node 1 as an IAB-node (not as a UE). For example, the Donor CU may be configured with a list of node identities (e.g., IMSI or S-TMSI) that may be allowed to use the service from the donor. The information may be used by the CU in the subsequence operations, for example, to distinguish a UE from an IAB-node.

As described above, following the RRC connection establishment procedure, the DU of IAB-node 1 and IAB-donor may proceed with F1 setup procedure using the F1-AP* protocol, which may activate one or more cells served by the DU of IAB-node 1—thereby allowing other IAB nodes and/or UEs to camp on the cell. In this procedure, the Adaptation Layer for IAB-node 1 and IAB-donor may be configured and activated as well.

FIG. 6B illustrates an example message sequence for an IAB-node (IAB-node 2) to establish an RRC connection with an IAB-donor, followed by the F1 setup procedure. It is assumed in this embodiment that IAB-node 1 has already performed the process disclosed in FIG. 6A to establish an RRC and F1-AP* connection. Referring back to FIG. 3, the IAB-node 2 shown in communication via the radio interface with IAB-node 1, may be also depicted in FIG. 6B as a child node of IAB-node 1 according to aspects of the present embodiments.

Due to the nature of wireless communications, the wireless backhaul links are susceptible to be deteriorated or broken at any time. In aspects of the present embodiments, the MT part of an IAB-node may constantly monitor the quality of the radio link and/or signal quality on the upstream of the IAB-node, where the radio link may be to a parent IAB node/donor of the IAB-node. If radio problems cannot be recovered in a designated duration, the MT may declare Radio Link Failure (RLF), meaning a loss of communication link may have occurred or signal strength is weak to continue (e.g., below a threshold).

Figure 7:
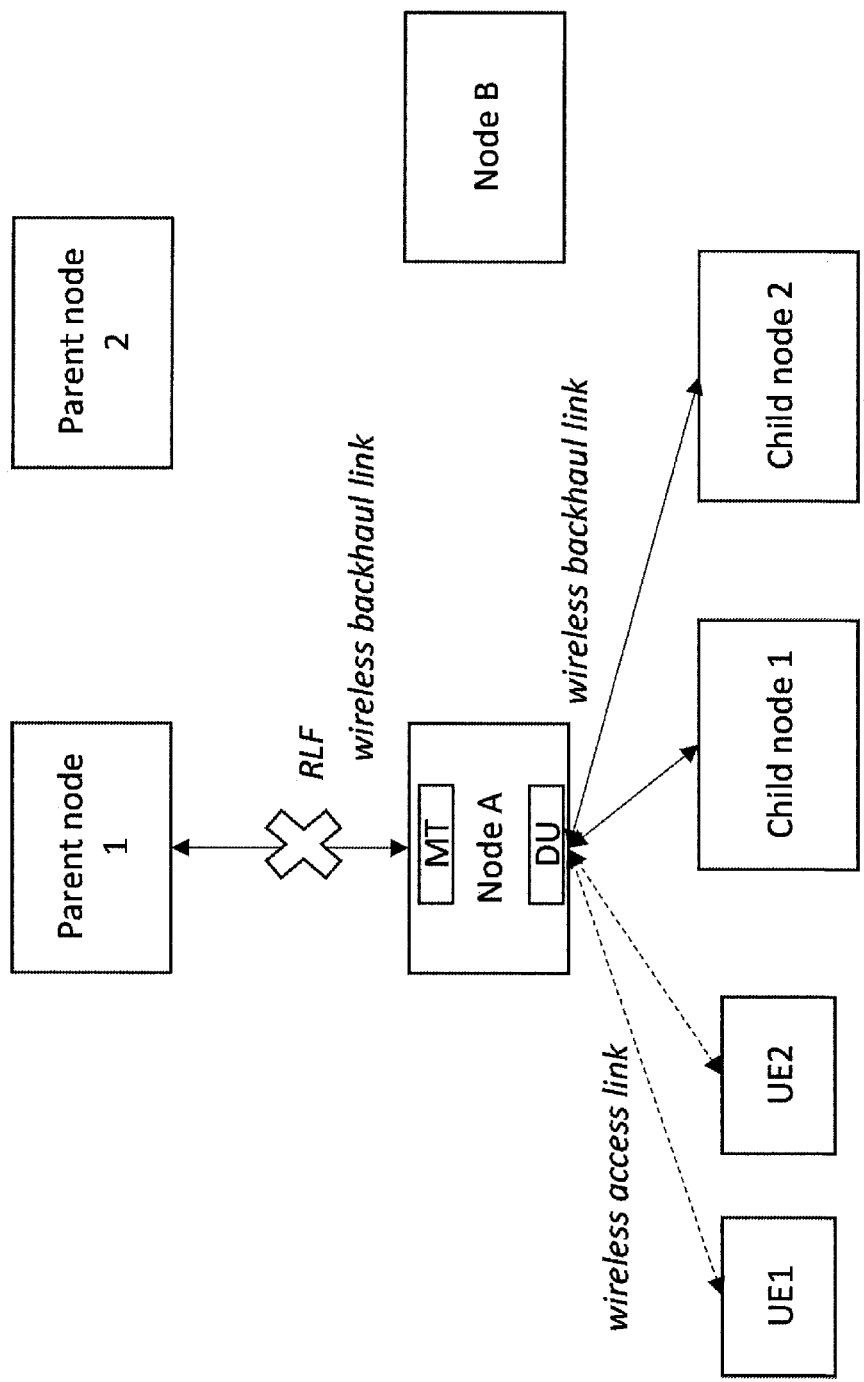
FIG. 7 is a diagrammatic view of an example scenario where an IAB-node detects a Radio Link Failure (RLF) on the upstream link to its parent node.

FIG. 7 is a diagrammatic view illustrating an example scenario where an IAB-node detects a Radio Link Failure (RLF) on the upstream link to its parent node. As illustrated in in FIG. 7, an IAB-node (Node A) detects RLF on the upstream link to its parent node (Parent node 1). In some embodiments, the MT component of Node A may need to find another parent that is visible from the node. In this case, the MT component may perform a cell selection procedure, and if a suitable cell (Parent node 2) is successfully found, the Node A may then proceed with an RRC reestablishment procedure with the suitable cell (Parent node 2). It should be noted that Node A in this scenario needs to find a cell served by either an IAB-node or an IAB-donor (i.e., non-IAB-capable cells are not suitable). In one embodiment, a cell served by either an IAB-node or an IAB-donor may broadcast (e.g., in the system information, such as MIB, system information block type 1 (SIB1) or any of the other SIBs) a state, e.g., via a flag, as an indication indicating the IAB capability, which may further comprise an indication of the IAB functionality, a node type (IAB-node or IAB-donor), a hop count and/or the current state of the connectivity to the parent node. Alternatively, or in parallel, Node A may have been pre-configured or configured by the network with a list of IAB-capable cell identifications.

While Node A is trying to find a new suitable IAB-capable serving cell, the child IAB nodes (Child node 1 and Child node 2) and/or UEs (UE1 and UE2) may still be in connected mode with Node A. If Node A successfully recovers from the RLF before expiration of a pre-configured (or network-configured) period of time, the child nodes and/or the UEs may not be aware of the RLF. However, in the scenario where Node A fails or has failed to recover from the RLF in a timely manner (e.g., before expiration of a pre-configured/network-configured period of time), not only may these child nodes/UEs suffer discontinuity of service, but also all the nodes/UEs in the downstream may also suffer discontinuity of service.

The present embodiments disclose systems, methods, and device where an IAB-node may inform connected nodes (child nodes) or UEs, of the upstream radio conditions. In some embodiments, the upstream radio condition information may enable the child nodes or UEs to decide to stay connected with the IAB-node or to look for another node to connect to.

Figure 8:
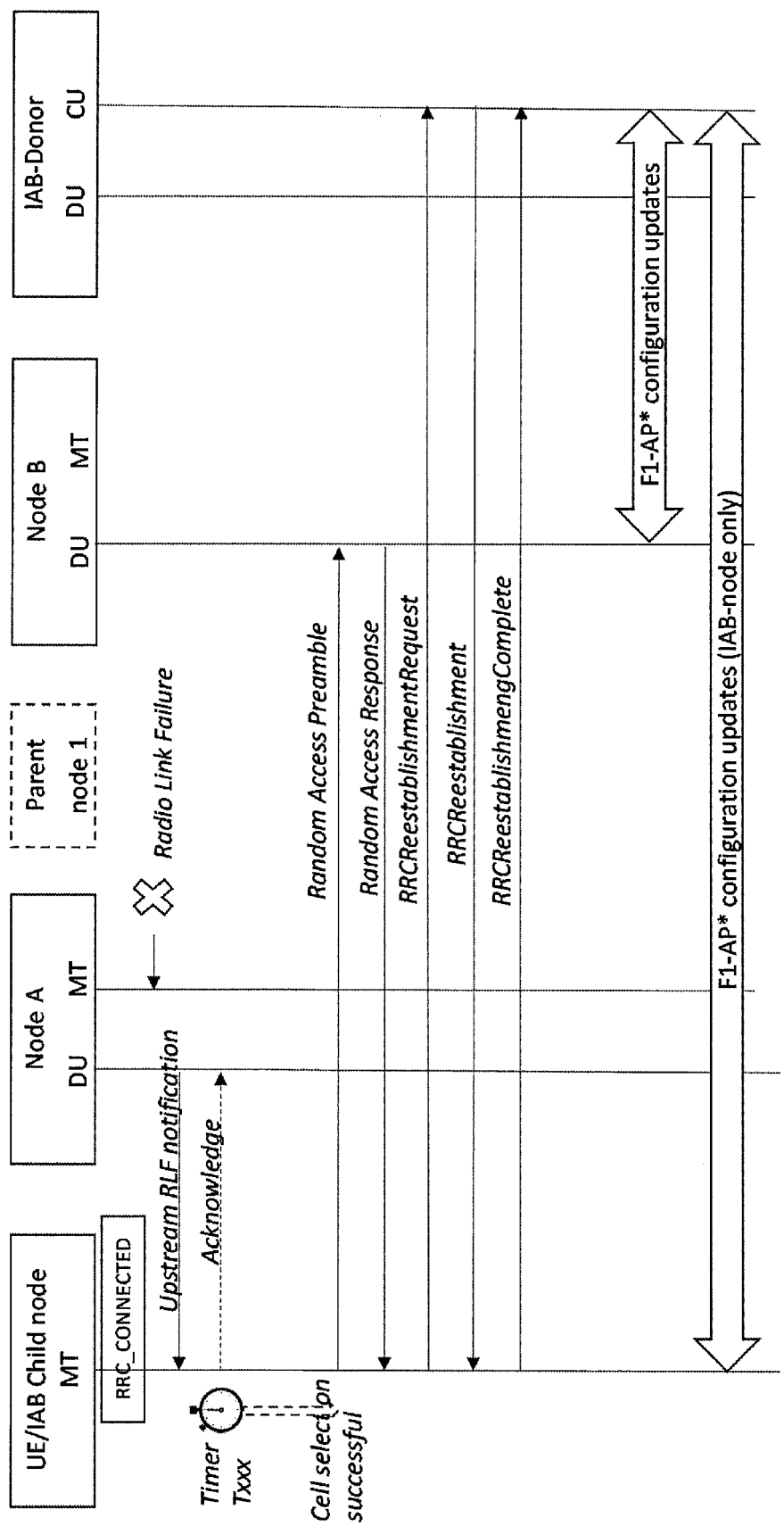
FIG. 8 illustrates an example flow of information transmission/reception and/or processing by a UE and/or IAB-node connected to a set of IAB-nodes in communication with an IAB-donor, for processing a notification of an RLF.

FIG. 8 illustrates an example flow of information transmission/reception and/or processing by a UE and/or IAB-node connected to a set of IAB-nodes in communication with an IAB-donor, for processing a notification of an RLF. As illustrated in FIG. 8, a notification of an RLF, sent from a node (Node A) and detected on the node's upstream, to the child nodes and/or the directly connected UEs. In one embodiment, upon receiving the notification, each of the child nodes and/or UEs may perform cell selection and, if successful, proceed to RRC reestablishment. As illustrated in FIG. 8, each of the child nodes and/or UEs, after a successful selection to a new node (Node B), may start the reestablishment procedure through Node B. That is, once a successful selection is made, the child nodes and/or UEs may transmit Random Access Preamble/Response messages, followed by RRCReestablishmentRequest and subsequent messages as illustrated in FIG. 8.

In one embodiment, Upstream RLF notification may be carried by the Adaptation Layer (e.g., a header part or a message body of the Adaptation Layer protocol). In an alternate embodiment, or in addition to, the notifications may be carried by the RLC sublayer, MAC, or a physical layer signaling (e.g., PDCCH). Additionally or alternatively, the notifications may be broadcasted via system information (e.g., MIB, SIB1 or any of the other SIBs) or transmitted in a dedicated manner.

Accordingly, in one embodiment, RRC resident in each of the child nodes and/or UEs may perform cell selection upon receiving a notification indicating the reception of the Upstream RLF notification from lower layers. In the present embodiments, this may be performed even if the radio link to the parent node remains in good condition. The node and/or UE may then start a timer, timer Txxx (e.g., T311 specified in 3GPP TS 38.331), based on the received notification, and upon selecting a suitable cell while timer Txxx is running, the node and/or UE may stop timer Txxx and initiate transmission of RRCReestablishmentRequest to the IAB-donor.

Once the RRC connection is reestablished, the CU of the IAB-donor may update the F1-AP* configurations in Node B as well as the child IAB-node that initiated the RRC reestablishment. In the scenario where the connecting device is a UE, F1-AP* configuration updates are not needed as they do not have the F1-AP* interface. Accordingly, the updated configuration from the IAB-donor may be used to reconfigure the routing topology which was modified or changed due to the RLF.

Figure 9A:
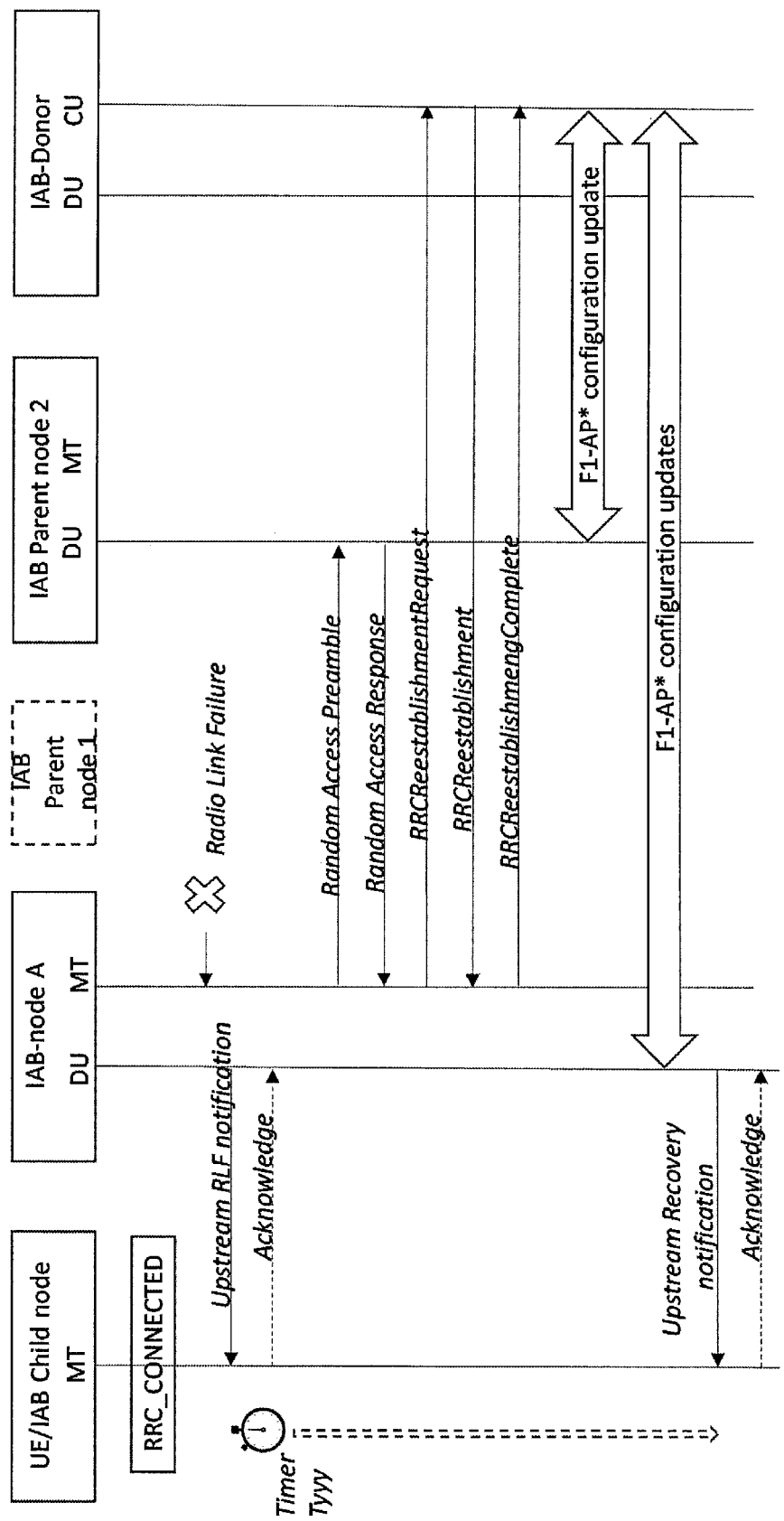
FIG. 9A illustrates an example flow of information transmission/reception and/or processing by a UE and/or IAB-node connected to a set of IAB-nodes in communication with an IAB-donor, based on receiving an Upstream RLF notification.

FIG. 9A illustrates an example flow of information transmission/reception and/or processing by a UE and/or IAB-node connected to a set of IAB-nodes in communication with an IAB-donor, based on receiving an Upstream RLF notification. As illustrated in FIG. 9A, the child nodes and/or UEs may start a timer, for example, timer Tyyy, based on receiving an Upstream RLF notification. While the timer Tyyy is running, Node A may attempt to recover the upstream link by performing cell selection. In the scenario depicted in FIG. 9, Node A has successfully found a new parent node (Parent node 2) and may initiate the RRC reestablishment procedure. Node A, based on receiving F1-AP* configuration update from the CU of the IAB-donor, may transmit/send Upstream Recovery notification-a notification indicating that the upstream is recovered—to the child IAB-node and/or the UEs. If timer Tyyy has not expired yet, the child IAB-node and/or the UEs that receive the notification may stop timer Tyyy and stay connected with Node A. If the timer expires before receiving Upstream Recovery notification, the child IAB-node and/or the UEs may perform cell selection/RRC reestablishment as illustrated in FIG. 8. In one embodiment, the timer value/configuration may be pre-configured. In another embodiment, the timer value/configuration may be configured by the parent node (e.g., Parent node 1) via a dedicated signaling or via a broadcast signaling (e.g., system information, such as MIB, SIB1 or any of the other SIBs).

Similar to the previous scenario, in one embodiment, the Upstream RLF notification may be carried by the Adaptation Layer, RLC, MAC, or a physical layer signaling. Additionally, the notifications may be broadcasted via system information (e.g., MIB, SIB1 or any of the other SIBs) or transmitted in a dedicated manner.

In yet another embodiment for this scenario, RRC resident in each of the child nodes and/or UEs may start timer Tyyy upon receiving Upstream RLF notification from the lower layers. If the node and/or UE receive a notification indicating the reception of the Upstream RLF notification from lower layers while timer Tyyy is running, the node and/or UE may stop timer Tyyy. If timer Tyyy expires, the node and/or UE may then start timer Txxx and upon selecting a suitable cell while the timer is running, the node and/or UE may stop the timer and initiate transmission of RRCReestablishmentRequest.

Figure 9B:
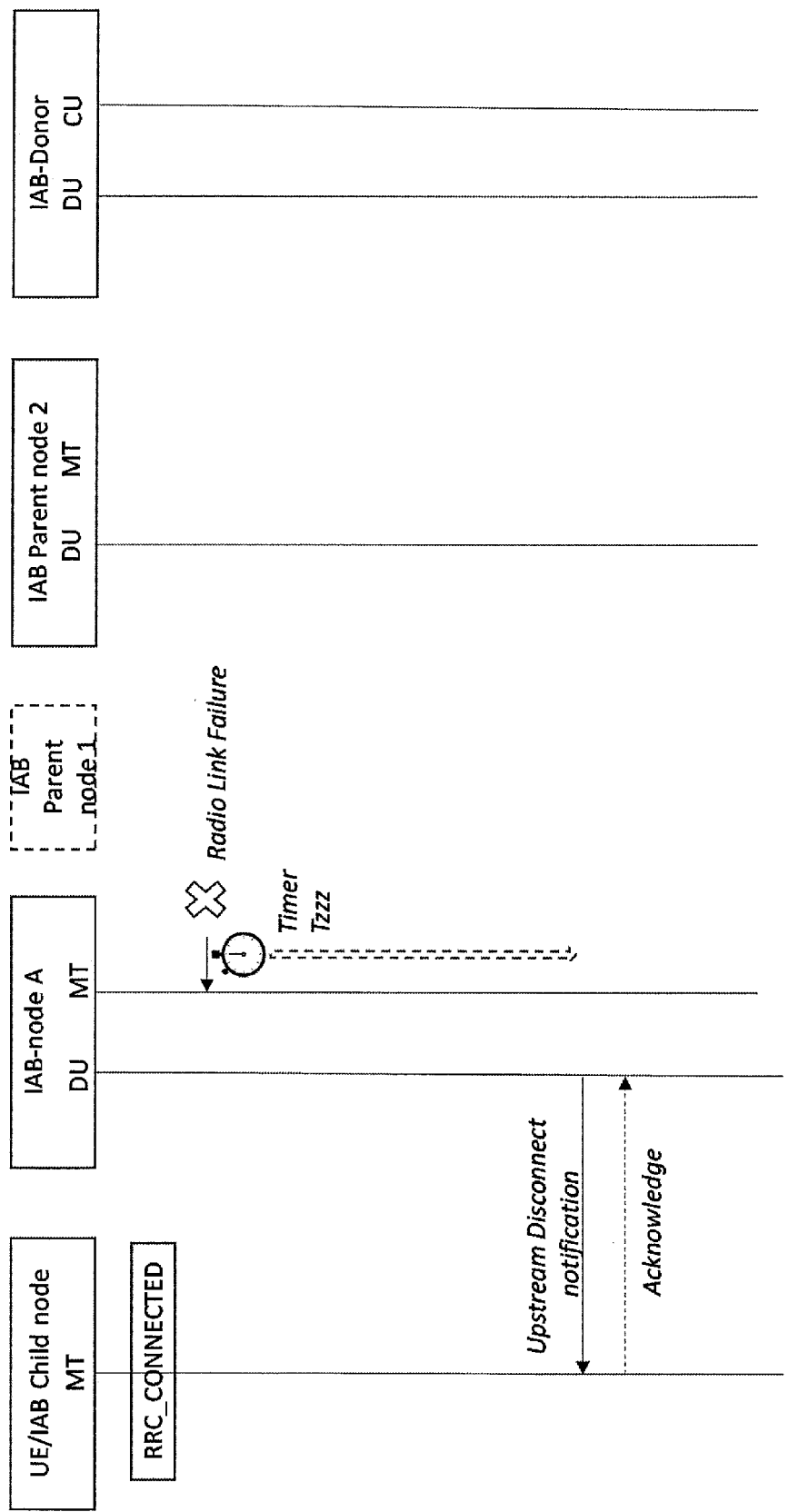
FIG. 9B illustrates another example flow of information transmission/reception and/or processing by a UE and/or IAB-node connected to a set of IAB-nodes in communication with an IAB-donor, based on not having received an Upstream RLF notification.

FIG. 9B illustrates another example flow of information transmission/reception and/or processing by a UE and/or IAB-node connected to a set of IAB-nodes in communication with an IAB-donor, based on not having received an Upstream RLF notification. As illustrated in FIG. 9B, Node A may start a timer Tzzz upon detecting an RLF. In this scenario, Node A may or may not send the aforementioned Upstream RLF notification to the child IAB-nodes and/or UEs. While the timer Tzzz is running, Node A may attempt to recover the upstream link by performing cell selection. In the scenario depicted in FIG. 9B, at the timer Tzzz expiry (cell selection failure), Node A may send a notification (e.g. Upstream Disconnect notification) to the child IAB-nodes/UEs notifying the unsuccessful RLF recovery. In this case, the child IAB-nodes/UEs that receive the notification may start the aforementioned timer Txxx and initiate the cell selection procedure as illustrated in FIG. 8. The notification may be carried by the Adaptation Layer, RLC, MAC, or a physical layer signaling, in a broadcast or a dedicated manner. In one embodiment, the timers Txxx and Tzzz may be the same timer or share same configurations. In another embodiment, the timers Txxx and Tzzz may be different timers or differently configured.

Additionally, notifications that an IAB-node provides to its downstream (children/UEs) may not be limited to RLF or RLF recovery. In some embodiments, the IAB-node may inform child nodes and/or UEs of the signal quality (e.g., Reference Signal Received Power (RSRP), Reference Signal Received Quality (RSRQ)), error rates, and/or any other types of measurements that indicate the radio condition of the upstream. In this case, IAB-nodes and/or UEs may be pre-configured or configured by the network with conditions for initiating cell selection/reestablishment. The notifications may be carried by the Adaptation Layer, RLC, MAC, or a physical layer signaling, in a broadcast or a dedicated manner.

In one embodiment, upon receiving one of the notifications from the parent node, the IAB-node and/or UE may send back or respond with an acknowledgement to the parent node, as shown in FIG. 8, FIGS. 9A and 9B.

Figure 10:
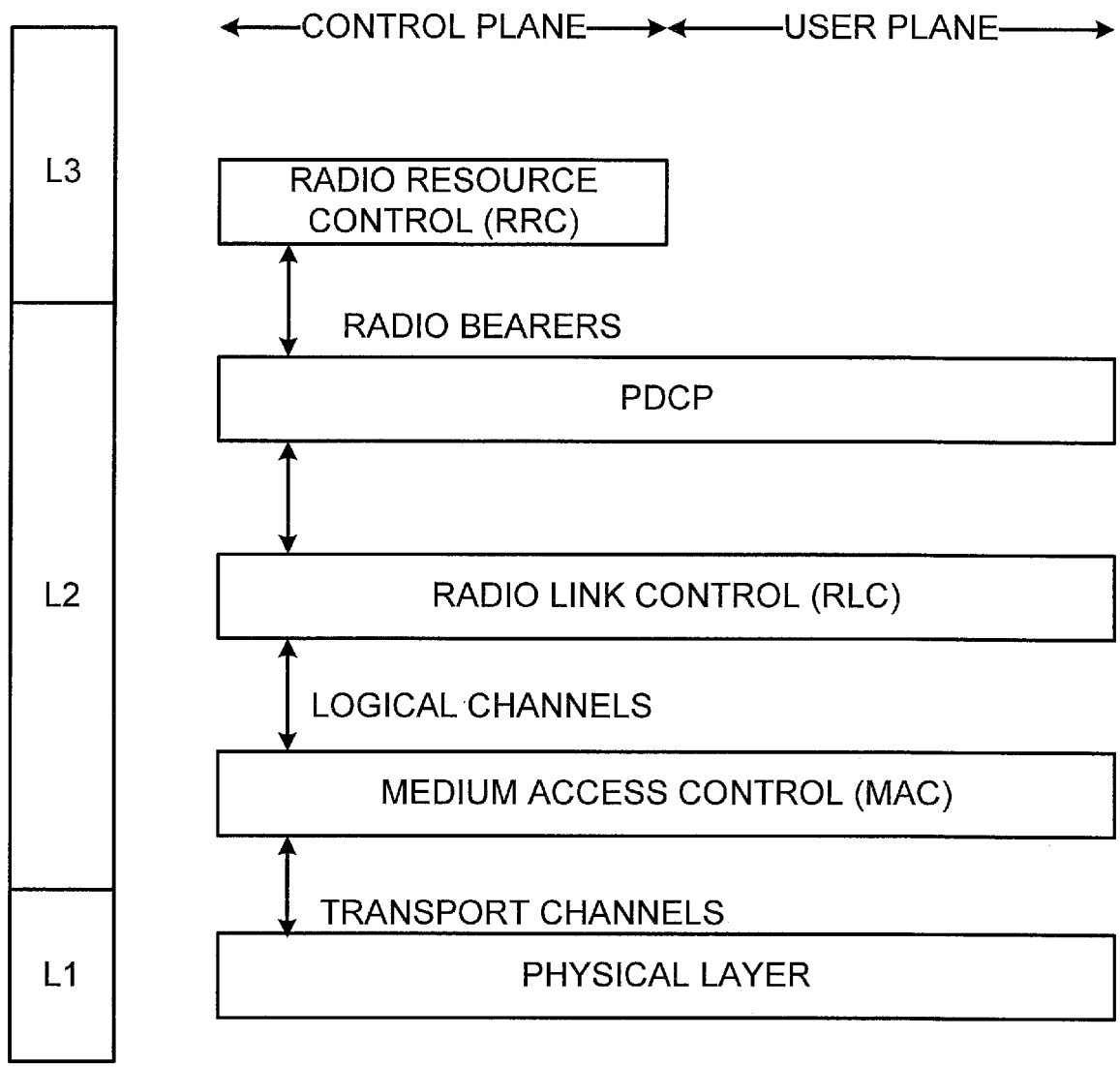
FIG. 10 is a diagrammatic view illustrating an example of a radio protocol architecture for the control and user planes in a mobile communications network.

FIG. 10 is a diagram illustrating an example of a radio protocol architecture for the control and user planes in a mobile communications network. The radio protocol architecture for the UE and/or the gNodeB may include three layers: Layer 1, Layer 2, and Layer 3. Layer 1 (L1 layer) is the lowest layer and implements various physical layer signal processing functions. Layer 2 (L2 layer) is above the physical layer and responsible for the link between the UE and/or gNodeB over the physical layer. In the user plane, the L2 layer may include a media access control (MAC) sublayer, a radio link control (RLC) sublayer, and a packet data convergence protocol (PDCP) sublayer, which are terminated at the gNodeB on the network side. Although not shown, the UE may have several upper layers above the L2 layer including a network layer (e.g., IP layer) that is terminated at the PDN gateway on the network side, and an application layer that is terminated at the other end of the connection (e.g., far end UE, server, etc.). The control plane also includes a radio resource control (RRC) sublayer in Layer 3 (L3 layer). The RRC sublayer is responsible for obtaining radio resources (i.e., radio bearers) and for configuring the lower layers using RRC signaling between the IAB-nodes and/or the UE and an IAB-donor.

Addressing Backhaul Conditions with Autonomous Handover

Figure 11:
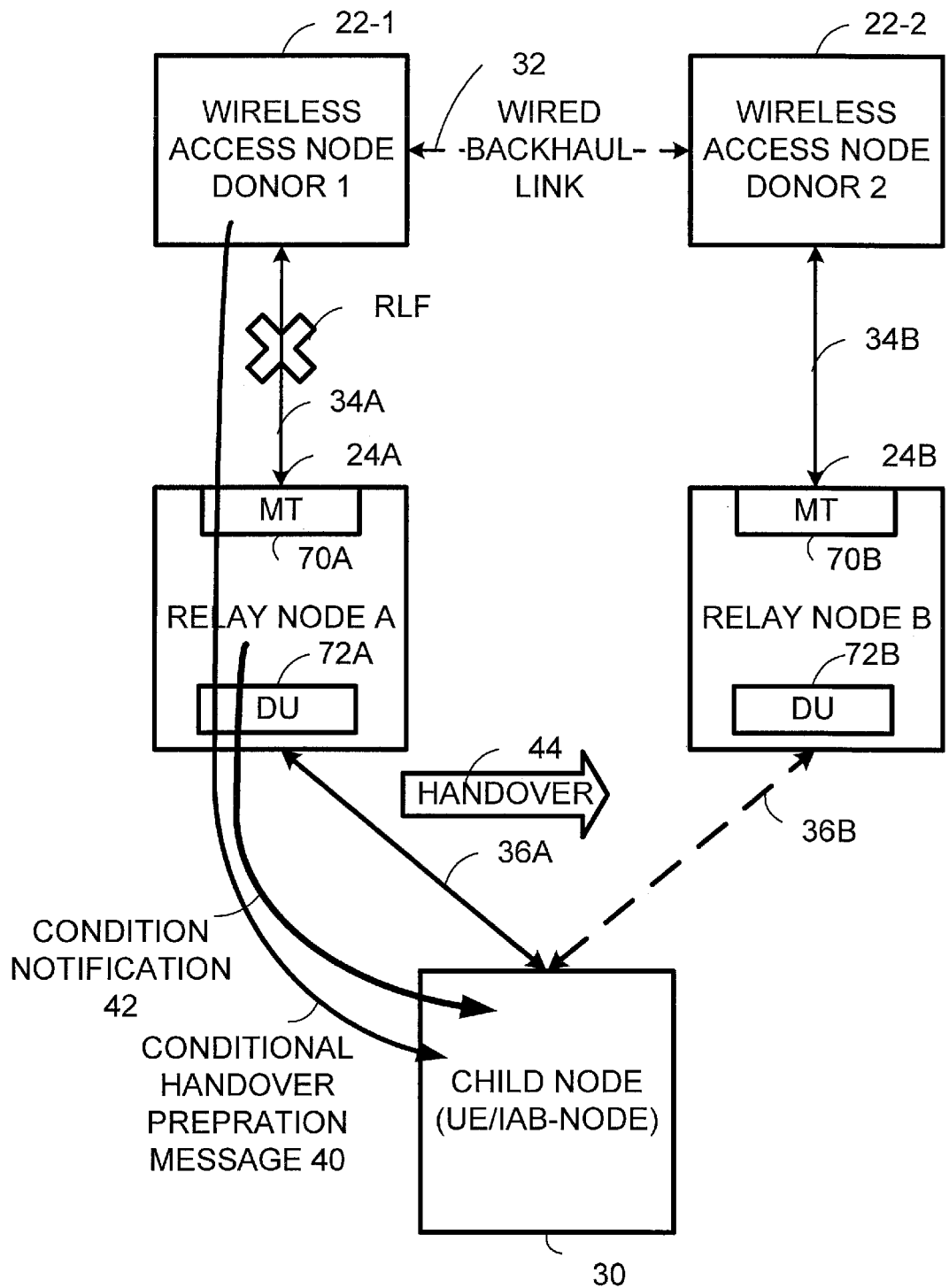
FIG. 11 is a diagrammatic view showing another example diagram of a telecommunications system in which a conditional autonomous handover may be performed for resolving a wireless link backhaul condition.

FIG. 11 is a diagrammatic view illustrating another example diagram of a telecommunications system in which a conditional autonomous handover may be performed for resolving a wireless link backhaul condition. As illustrated in FIG. 11, a telecommunications system 20 comprises wireless access node 22-1, also known as Donor node 1; wireless access node 22-2, also known as Donor node 2; IAB-node 24A, also known as Node A or relay node A; IAB-node 24B, also known as Node B or relay node B; and child node 1, also known as child node 30. The child node 30 may be, for example, a user equipment, UE, or Integrated Access and Backhaul (IAB) node, as previously described.

The wireless access node 22-1 and wireless access node 22-2 may be connected by a wired backhaul link 32. The other elements of FIG. 11 may be connected by wireless backhaul links, e.g., the wireless access node 22-1 may be connected by wireless backhaul link 34A to IAB-node 24A; the wireless access node 22-2 may be connected by wireless backhaul link 34B to IAB-node 24B; the IAB-node 24A may be connected by wireless backhaul link 36A to child node 30; and the IAB-node 24B may be connected by 36B to child node 30.

The example embodiments and modes of FIG. 11-FIG. 15 concern addressing problematic conditions on a wireless backhaul link using an autonomous handover. In general terms, the wireless access node 22-1 generates and sends to child node 30 a message which comprises information configured to facilitate a conditional handover of the wireless terminal. As used herein, the terms "handover" and "handoff" may be used interchangeably, and generally involve transfer of a connection or communication, at least partially, from one node or set of nodes to another node. Although the message may be of any appropriate type and bear any suitable name, in an example embodiment and mode described herein the message is a reconfiguration message and, for sake of illustration, is arbitrarily and not exclusively known, and shown in FIG. 11, as the conditional handover preparation message 40. The information comprising such message, e.g., the conditional handover preparation message 40, includes at least one identity of a target cell and one or more conditions which at least partially enable the wireless terminal to perform a conditional handover autonomously. In some configurations, the identity of a target cell may comprise one of or a combination of; a physical cell identity (PCI), CellIdentity (a cell identifier to unambiguously identify a cell within a PLMN), a PLMN-identity, a tracking area identity, and a RAN area code. As understood herein, the one or more conditions including a reception of a notification from the wireless relay node, e.g., from IAB-node 24A. Such notification is also known herein and shown in FIG. 11 as condition notification 42, and may be notification of a problematic condition on a wireless backhaul link. Upon reception of the condition notification 42, the child node 30 may perform an autonomous handover, depicted as event 44 in FIG. 11. The performance of the autonomous handover 44 is based on, e.g., enabled by using at least, the information provided in the conditional handover preparation message 40.

Figure 12:
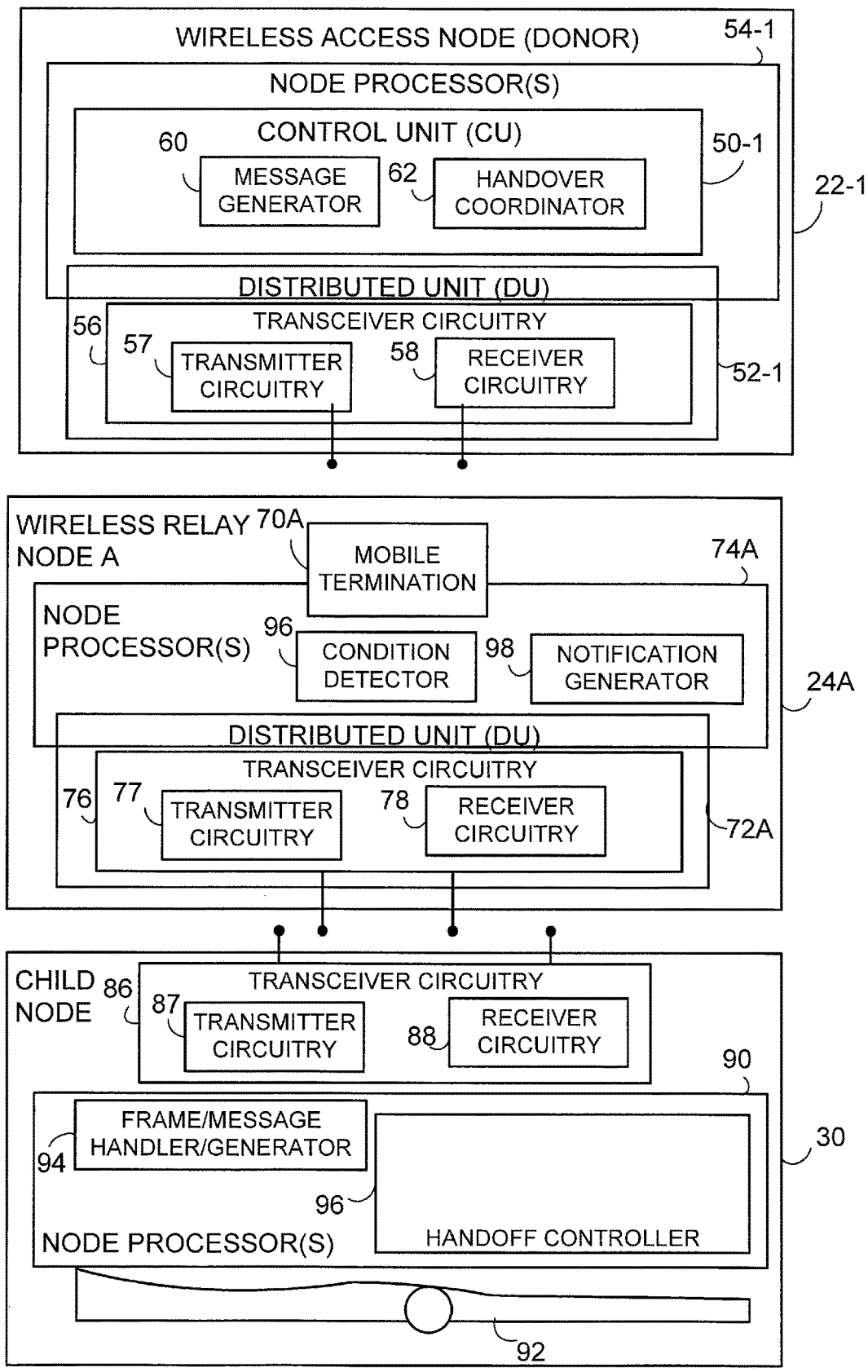
FIG. 12 is a diagrammatic view showing an example, non-limiting more detailed implementation of at least portions of the system of FIG. 11.

FIG. 12 is a diagrammatic view illustrating an example, non-limiting more detailed implementation of at least portions of the system illustrated in FIG. 11. Various components and functionalities of the nodes shown in FIG. 11 are further shown in FIG. 12. FIG. 12 shows wireless access node 22-1 as comprising central unit 50-1 and distributed unit 52-1. The central unit 50-1 and distributed unit 52-1 may be realized by, e.g., be comprised of or include, one or more processor circuits, e.g., node processor(s) 54-1. The one or more node processor(s) 54-1 may be shared by central unit 50-1 and distributed unit 52-1, or each of central unit 50-1 and distributed unit 52-1 may comprise one or more node processor(s) 54-1. Moreover, central unit 50-1 and distributed unit 52-1 may be co-located at a same node site, or alternatively one or more distributed units 52-2 may be located at sites remote from central unit 50-1 and connected thereto by a packet network. The distributed unit 52-1 may comprise transceiver circuitry 56, which in turn may comprise transmitter circuitry 57 and receiver circuitry 58. The transceiver circuitry 56 includes antenna(e) for the wireless transmission. Transmitter circuitry 57 includes, e.g., amplifier(s), modulation circuitry and other conventional transmission equipment. Receiver circuitry 58 comprises, e.g., amplifiers, demodulation circuitry, and other conventional receiver equipment.

As further shown in FIG. 12, node processor(s) 54-1 of wireless access node 22-1 may comprise message generator 60 and handover coordinator 62. The message generator 60 serves to generate, e.g., the conditional handover preparation message 40 as described herein. As mentioned above, the conditional handover preparation message 40 includes information comprising at least one identity of a target cell and one or more conditions for the wireless terminal performing the conditional handover autonomously. The handover coordinator 62 serves to communicate with the target cell, e.g., with another node which may be involved in the handover, so that suitable information and preparation can be obtained for the handover. In the example scenario described herein, the target cell will be a cell served by wireless access node 22-2.

As shown in FIG. 12 the IAB-node 24A, also known as wireless relay node 24A, in an example embodiment and mode comprises relay node mobile termination unit 70A and relay node distributed unit 72A. The relay node mobile termination unit 70A and relay node distributed unit 72A may be realized by, e.g., by comprised of or include, one or more processor circuits, e.g., relay node processor(s) 74A. The one or more relay node processor(s) 74A may be shared by relay node mobile termination unit 70A and relay node distributed unit 72A, or each of relay node mobile termination unit 70A and relay node distributed unit 72A may comprise one or more relay node processor(s) 74A. The relay node distributed unit 72A may comprise transceiver circuitry 76, which in turn may comprise transmitter circuitry 77 and receiver circuitry 78. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment.

FIG. 12 further shows that IAB-node 24A may comprise radio condition detector 96 and notification generator 98. Both condition detector 96 and notification generator98 may be realized or comprised by relay node processor(s) 74. The notification generator98 serves to generate the condition notification 42, based on a condition detected by condition detector 96.

Figure 15:
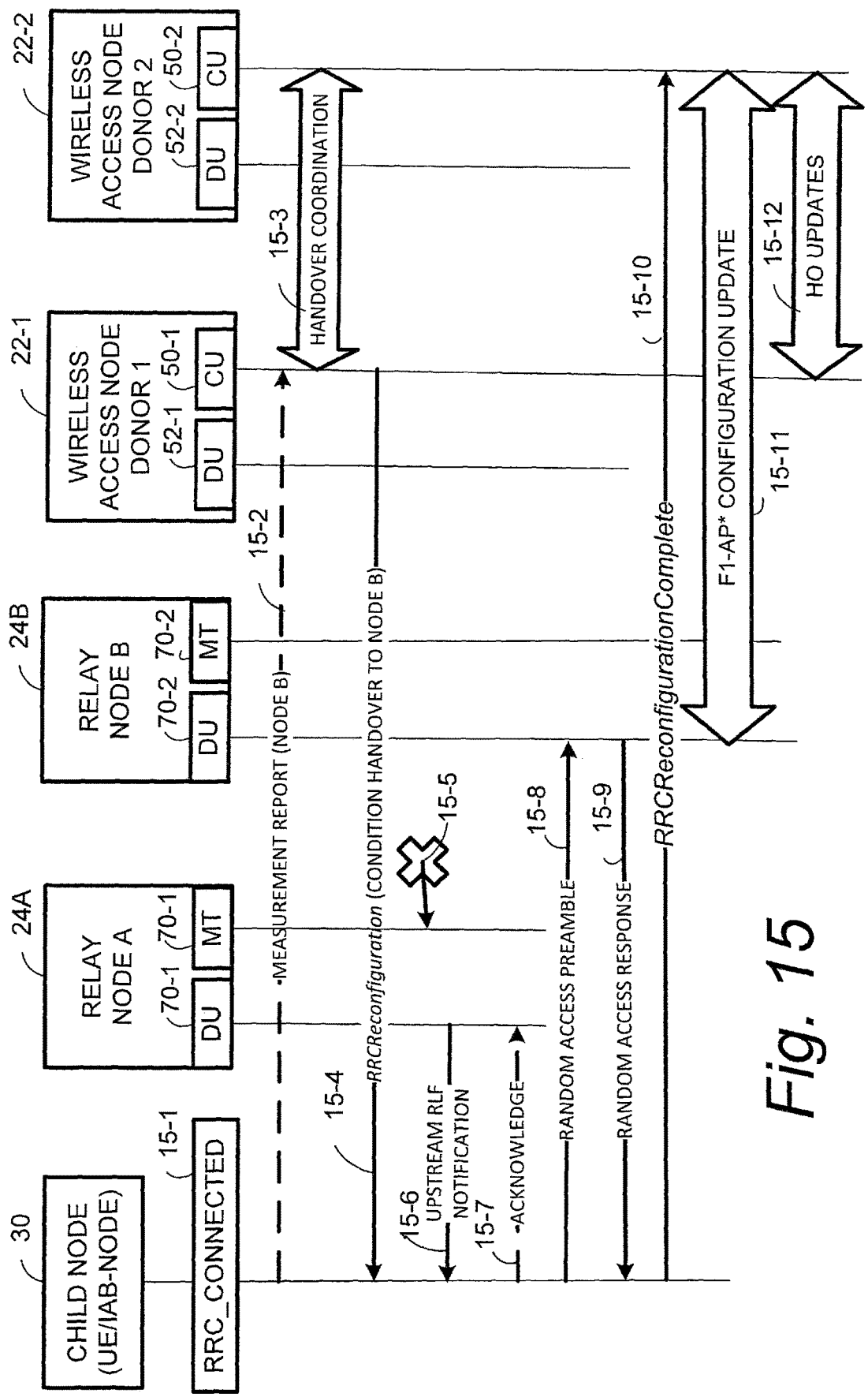
FIG. 15 depicts example, basic, representative acts or steps of a message flow for the system scenario shown in FIG. 11.

It should be understood that, although not illustrated in FIG. 12, the wireless access node 22-2 and IAB-node 24B of FIG. 11 and of FIG. 15 may have similar components and functionalities as the wireless access node 22-1 and IAB-node 24A, respectively, but with differently numbered/alphabetized suffixes denoting comparable components.

FIG. 12 shows child node 30 as comprising, in an example, non-limiting embodiment and mode, transceiver circuitry 86. The transceiver circuitry 86 in turn may comprise transmitter circuitry 87 and receiver circuitry 88. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment. FIG. 12 further shows child node 30, which (as indicated before) may be a user equipment or Integrated Access and Backhaul (IAB) node, as also comprising node processor circuitry, e.g., one or more node processor(s) 90, and interfaces 92, including one or more user interfaces. Such user interfaces may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

In an example, non-limiting embodiment and mode shown in FIG. 12, the child node 30 may include frame/message generator/handler 94 and handover controller 96. As is understood by those skilled in the art, in some telecommunications system messages, signals, and/or data are communicated over a radio or air interface using one or more "resources", e.g., "radio resource(s)". The frame/message generator/handler 94 serves to handle messages, signals, and data received from other nodes, including but not limited to the conditional handover preparation message 40 and condition notification 42 described herein.

In a most basic example embodiment and mode, a wireless access node of the technology disclosed herein transmits a message which comprises information configured to facilitate a conditional handover of the wireless terminal, the information comprising at least one identity of a target cell and one or more conditions for the wireless terminal performing the conditional handover autonomously, the conditions including a reception of a notification from the wireless relay node. In a most basic example embodiment and mode of the technology disclosed herein, the wireless terminal, e.g., child node 30, receives such message.

Figure 13:
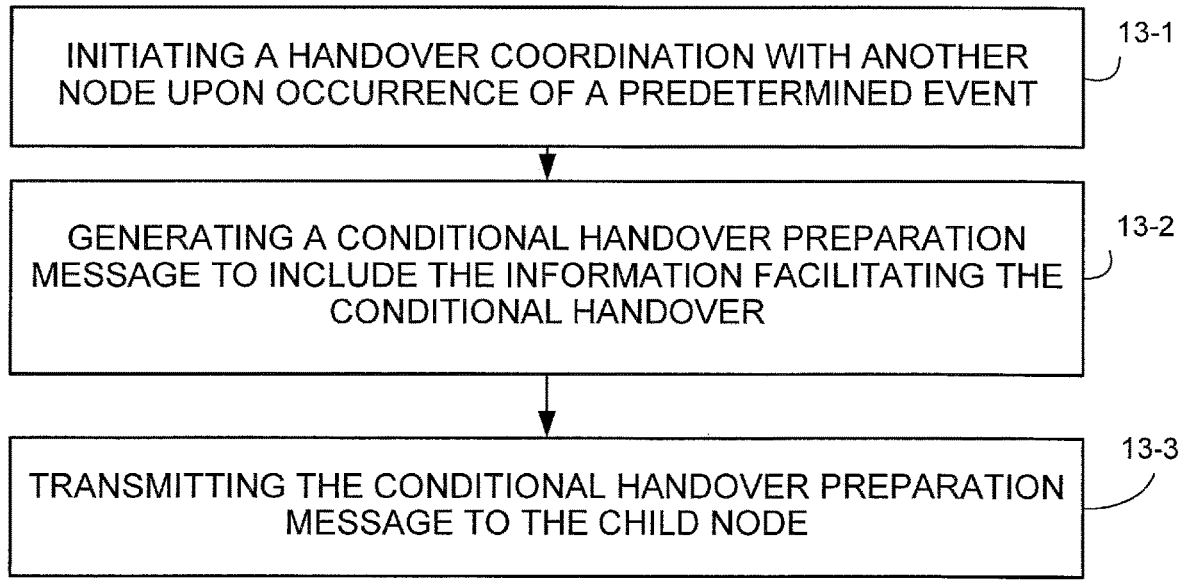
FIG. 13 is a flowchart showing example, non-limiting, basic acts or steps that may be performed by a wireless access node of FIG. 11.

Beyond the basic example embodiment and mode mentioned above, FIG. 13 shows further example, optional, non-limiting, basic acts or steps that may be performed by the wireless access node 22-1 of FIG. 11 and FIG. 12. FIG. 13 is a flowchart illustrating example, non-limiting, basic acts or steps that may be performed by a wireless access node illustrated in FIG. 11. As illustrated in FIG. 13, Act 13-1 comprises initiating a handover coordination with another node upon occurrence of a predetermined event. In the example scenario described herein, the other node to be involved in the handover is wireless access node 22-2. The handover coordination of act 13-1 may be performed by handover coordinator 62, which works through a wired backhaul link interface to wireless access node 22-2. The predetermined event may be, for example, receipt of a measurement report from the wireless terminal, e.g., from child node 30, including a measurement regarding a signal received by the wireless terminal from another node, such as wireless access node 22-2. Act 13-2 comprises generating the conditional handover preparation message 40 to include the information facilitating the conditional handover 44. The conditional handover preparation message 40 may be generated, e.g., by message generator 60 of node processor(s) 54-1. Act 13-3 comprises sending or transmitting the conditional handover preparation message to child node 30, e.g., over the wireless backhaul links 34A and 36A and thus via IAB-node 24A.

Figure 14:
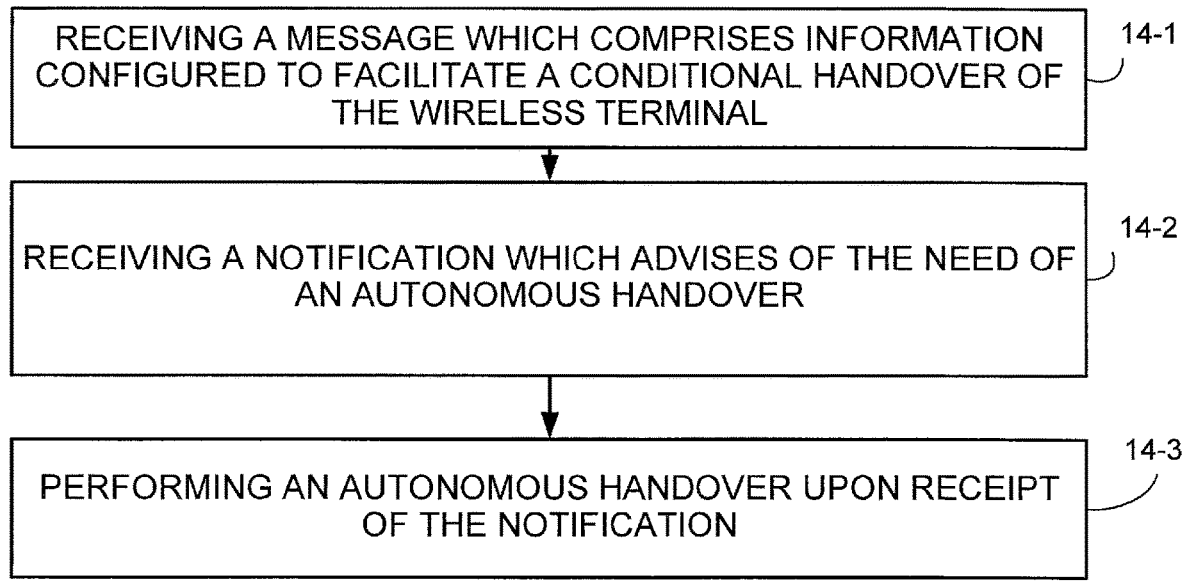
FIG. 14 is a flowchart showing example, non-limiting, basic acts or steps that may be performed by a child node of FIG. 11.

Beyond the basic example embodiment and mode mentioned above, FIG. 14 shows further example, optional, non-limiting, basic acts or steps that may be performed by child node 30 of FIG. 11 and FIG. 12. FIG. 14 is a flowchart illustrating example, non-limiting, basic acts or steps that may be performed by a child node illustrated in FIG. 11. As illustrated in FIG. 14, Act 14-1 comprises receiving a message which comprises information configured to facilitate a conditional handover of the wireless terminal. Such message may be, for example, the conditional handover preparation message 40 described herein, which comprises at least one identity of a target cell and one or more conditions for the wireless terminal performing the conditional handover autonomously. Act 14-2 comprises receiving the condition notification 42 from an appropriate node, such as IAB-node 24A, which advises of the possible need of an autonomous handover. Act 14-3 comprises, upon receipt of the condition notification 42, performing an autonomous handover 44 to another node, e.g., to wireless access node 22-2 through IAB-node 24B.

In an example scenario shown in FIG. 11, IAB-node 22A, also known as Node A or wireless access node 22A, may detect a radio condition, such as a radio link failure, RLF, on the upstream link to its parent node, e.g. wireless access node 22-1 or Donor 1. In the example scenario of FIG. 11, the Child Node 30, which may be an IAB-node or an UE, was configured by the donor-node wireless access node 22-1 with a conditional handover, e.g., conditional handover preparation message 40 which may be a reconfiguration with sync, in advance, which allows the child node 30 to autonomously perform a handover to a designated cell when one or more conditions configured by the RRC of the Donor 1 are satisfied. In some configurations, the conditions may include reception of some of the aforementioned notifications from a parent node, such as Upstream RLF notification. When such conditions are met, the Child Node 1, e.g., child node 30, may start accessing the designated cell (e.g. Node B/Donor 2, also called IAB-node 24B/wireless access node 22-2) and perform a handover procedure. In one example embodiment and mode, the Donor nodes 1 and 2 may be physically collocated or even the same entity. In another example embodiment and mode, these two donor nodes, e.g., wireless access node 22-1 and wireless access node 22-2, may be separate nodes, mutually connected by a wired backhaul link (as shown in FIG. 11). It is assumed that prior to providing the configuration for the conditional handover to Child node 30, the two donor nodes wireless access node 22-1 and wireless access node 22-2 may perform negotiations/coordination with regard to the handover, e.g., act 11-3, described above.

FIG. 15 illustrates example, basic, representative acts or steps of message flow for the system scenario illustrated in FIG. 11. As illustrated in FIG. 15, the child node 30 is in connected mode as shown by act 15-1. As act 15-3 the currently serving donor node, Donor 1 or wireless access node 22-1, may start a handover coordination with a node serving a potential target cell, e.g., Donor 2 or wireless access node 22-2. The coordination of act 15-3 may comprise sharing of identifications of the Child Node 1, e.g., child node 30; security parameters; and radio link configurations. As shown in FIG. 15, the coordination of act 15-3 may be triggered by act 15-2, e.g., receipt of a measurement report(s) transmitted by the Child Node 1, wherein the child node 30 reports sufficient signal quality observed from the Node B, e.g., from IAB-node 24B.

After the coordination of act 15-3 is completed, as act 15-4 the Child Node 30 (in the RRC_CONNECTED state, as indicated by act 15-1) may receive the conditional handover preparation message 40. In an example embodiment and mode, the conditional handover preparation message 40 may be a RRCReconfiguration message comprising potential target cells, e.g. the cell served by Node B or IAB-node 24B, and one or more conditions for an autonomous handover. In the example flow of FIG. 15, the conditions may include a reception of the Upstream RLF notification. The other non-limiting examples of conditions may include or comprise signal quality thresholds for the downlink signals from the currently serving node, e.g., Node A=IAB-node 24A), as well as some of the other aforementioned notifications, such as Upstream Disconnect notification.

In the example flow shown in FIG. 15, as act 15-5 the Node A, e.g., IAB-node 24A, may detect an RLF on the upstream link, e.g., on wireless backhaul link 32. The condition on the wireless backhaul link 32 may be detected by the condition detector 80 of IAB-node 24A. The Node A may then send the Upstream RLF notification 42 to its child nodes/UEs, including the Child node 30. The condition notification 42 may be generated by notification generator 82. As optional act 15-7, Child node 30 may send back an acknowledgement. Moreover, due to the configured conditions, as act 15-8 the child node 30 may initiate a conditional handover to the configured target cell, e.g., in the example scenario, the cell served by IAB-node 24B, by performing a random access procedure. The random access procedure in which child node 30 participates comprises, as act 15-8, sending a Random Access Preamble message to IAB-node 24B and, as act 15-9, receiving a Random Access Response message from IAB-node 24B. Act 15-10 comprises the child node 30 sending a RRCReconfigurationComplete message to the donor of the target cell, e.g., Donor 2=wireless access node 22-2 via Node B=IAB-node 24B. As act 15-11 wireless access node 22-2 may use F1-AP* to update the routing configurations at the Node B for the Child Node 1, e.g., at IAB-node 24B for child node 30, and as act 15-12 may interact with wireless access node 22-1 to report the completion of the conditional handover. The wireless access node 22-1 may then release the resources saved for child node 30.

Accordingly, in the example embodiment and mode of FIG. 11-FIG. 15, an IAB-node or a UE may be configured with a conditional handover with conditions, comprising a reception of a notification representing the radio condition of the upstream radio link of the parent node and at least one identification of a target node. Upon receiving such a notification, the IAB-node or the UE may then perform an autonomous handover to the cell served by the target node.

Addressing Backhaul Conditions Involving Redundant Connections

Figure 16:
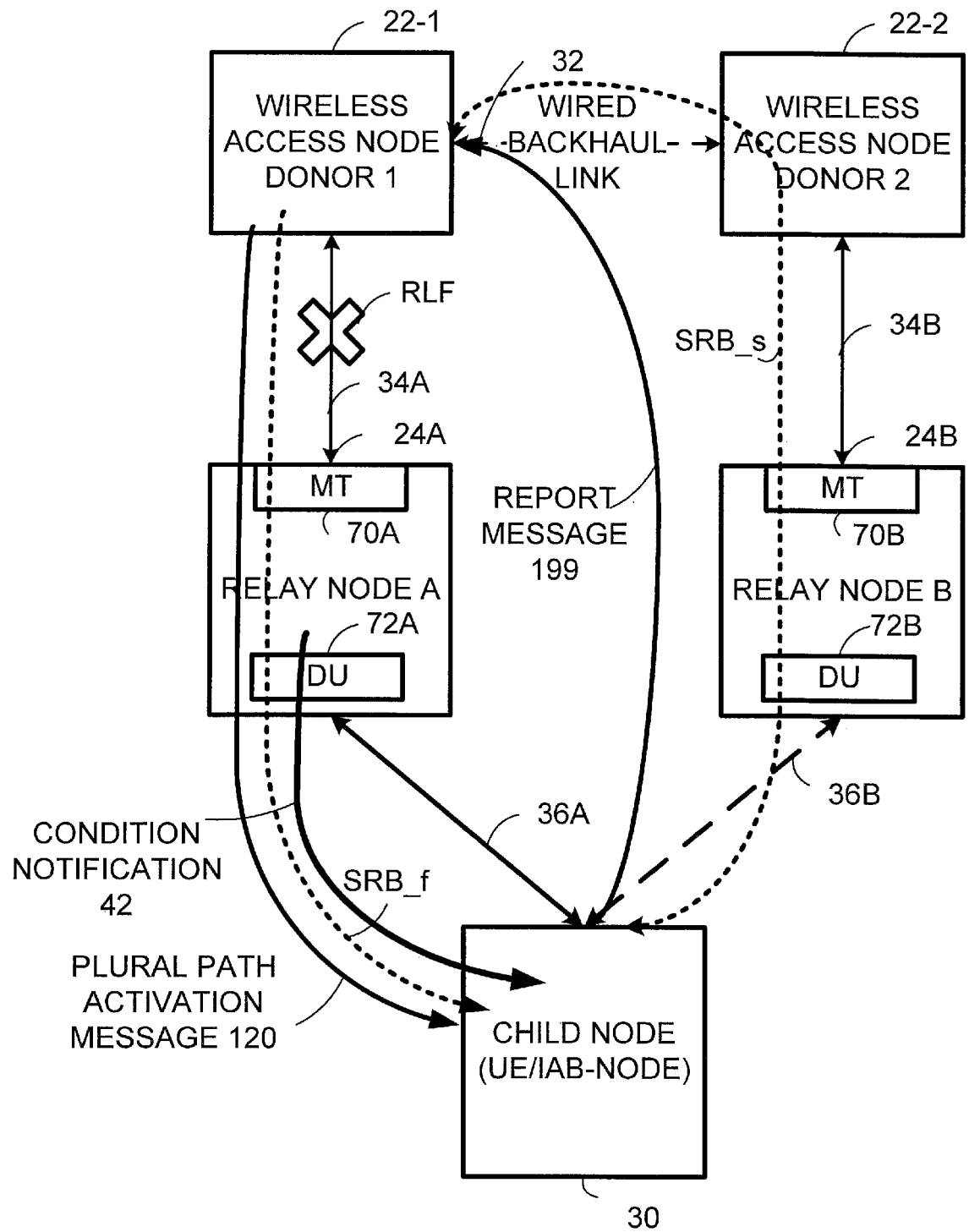
FIG. 16 is a diagrammatic view showing another example diagram of a telecommunications system in which a wireless link backhaul condition may be resolved when redundant links are utilized.

FIG. 16 is a diagrammatic view illustrating another example diagram of a telecommunications system in which a wireless link backhaul condition may be resolved when redundant links are utilized. As illustrated in FIG. 16, telecommunications system 20 which, like the telecommunications system 20 of FIG. 15, comprises wireless access node 22-1, also known as Donor node 1; wireless access node 22-2, also known as Donor node 2; IAB-node 24A, also known as Node A or relay node A; IAB-node 24B, also known as Node B or relay node B; and child node 1, also known as child node 30. The child node 30 may be, for example, a user equipment, UE, or Integrated Access and Backhaul (IAB) node, as previously described. The wireless access node 22-1 and wireless access node 22-2 may be connected by a wired backhaul link 32. The other elements of FIG. 16 may be connected by wireless backhaul links, e.g., the wireless access node 22-1 may be connected by wireless backhaul link 34A to IAB-node 24A; the wireless access node 22-2 may be connected by wireless backhaul link 34B to IAB-node 24B; the IAB-node 24A may be connected by wireless backhaul link 36A to child node 30; and the IAB-node 24B may be connected by 36B to child node 30.

The example embodiments and modes of FIG. 16-FIG. 20A, FIG. 20B concern addressing problematic conditions on a wireless backhaul link using redundant links. In general terms, the wireless access node 22-1 generates and sends to child node 30 at message which comprises information configured to activate plural signaling data paths, such as first signaling data path SRB_f and second signaling data path SRB_s shown in FIG. 16. The first signaling data path SRB_f is established between wireless access node 22-1 and the wireless terminal also known as child node 30, and has its signaling data routed via wireless access node 22-1 and IAB-node 24A. In one configuration, the second signaling data path SRB_s may be established between wireless access node 22-2 and child node 30 and has its signaling data relayed by IAB-node 24B. In another configuration (not shown in FIG. 16), the second signaling data path SRB_s may be established directly established between wireless access node 22-2 and child node 30 without being relayed by an IAB-node. It should be noted that either of the first or second signaling data path may be a master signaling radio bearer, e.g., the signaling data bearer that is established first, and the other signaling data path may be a secondary signaling radio bearer that may be added after the master signaling radio bearer is established.

Although the message(s) configured to activate the plural signaling data paths may be of any appropriate type and bear any suitable name, in an example embodiment and mode described herein the message is a reconfiguration message and, for sake of illustration, is arbitrarily and not exclusively known, and shown in FIG. 16, as the plural path activation message 120. The plural path activation message 120 is received by the child node 30, after which both the first signaling data path SRB_f and the second signaling data path SRB_s are activated. Should the child node 30 thereafter receive a notification from the IAB-node 24A, the child node 30 may generate a report message (also referred as a failure information message) and transmit the message through the second signaling path SRB_s. The report message may include information based on the notification, and the notification may be based on a radio condition detected on the first signaling data path.

Figure 17:
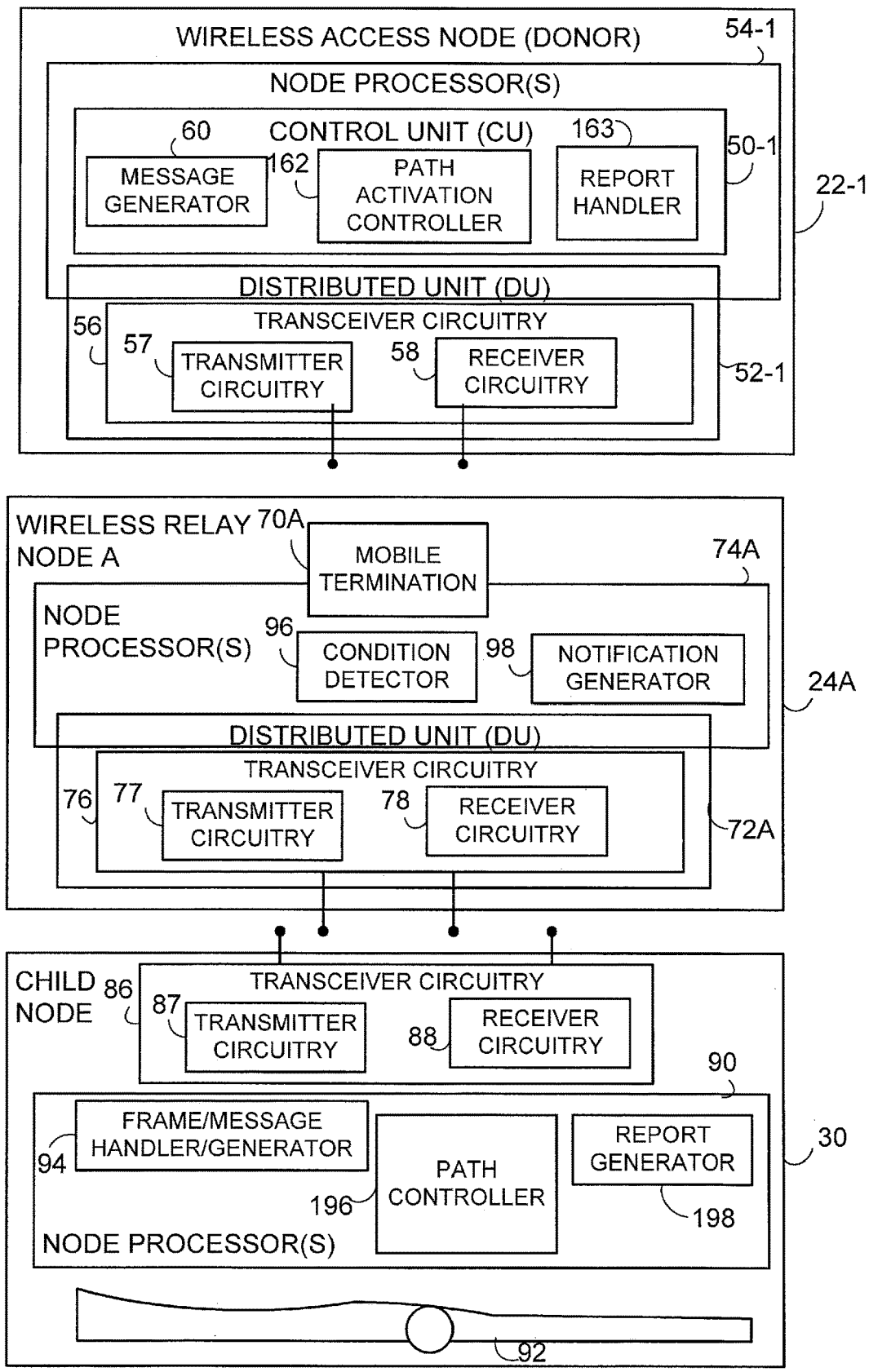
FIG. 17 is a diagrammatic view showing an example, non-limiting more detailed implementation of at least portions of the system of FIG. 16.

Various components and functionalities of the nodes illustrated in FIG. 16 are further illustrated in FIG. 17. FIG. 17 is a diagrammatic view illustrating an example, non-limiting more detailed implementation of at least portions of the system illustrated in FIG. 16. Components of FIG. 17 which have similar names to the components of FIG. 12 also have comparable function. FIG. 17 illustrates wireless access node 22-1 as comprising central unit 50-1 and distributed unit 52-1. The central unit 50-1 and distributed unit 52-1 may be realized by, e.g., by comprised of or include one or more processor circuits, e.g., node processor(s) 54-1. The one or more node processor(s) 54-1 may be shared by central unit 50-1 and distributed unit 52-1 or each of central unit 50-1 and distributed unit 52-1 may comprise one or more node processor(s) 54-1. Moreover, central unit 50-1 and distributed unit 52-1 maybe co-located at a same node site, or alternatively one or more distributed units 52-2 may be located at sites remote from central unit 50-1 and connected thereto by a packet network. The distributed unit 52-1 may comprise transceiver circuitry 56, which in turn may comprise transmitter circuitry 57 and receiver circuitry 58. The transceiver circuitry 56 includes antenna(e) for the wireless transmission. Transmitter circuitry 57 includes, e.g., amplifier(s), modulation circuitry and other conventional transmission equipment. Receiver circuitry 58 comprises, e.g., amplifiers, demodulation circuitry, and other conventional receiver equipment.

As further illustrated in FIG. 17, node processor(s) 54-1 of wireless access node 22-1 may comprise message generator 60; plural path controller 162; and report handler 163. The message generator 60 serves to generate, e.g., plural path activation message 120 as described herein. The plural path controller 162 serves, e.g., to activate the plural paths, including first signaling data path SRB_f and second signaling data path SRB_s. The report handler 163 is configured to receive and process a report from child node 30 which is based on a notification representing a radio condition detected on one of the signaling data paths.

As shown in FIG. 17 the IAB-node 24A, also known as wireless relay node 24A, in an example embodiment and mode comprises relay mobile termination unit 70A and relay distributed unit 72A. The relay mobile termination unit 70A and relay distributed unit 72A may be realized by, e.g., by comprised of or include one or more processor circuits, e.g., relay node processor(s) 74A. The one or more relay node processor(s) 74A may be shared by relay mobile termination unit 70A and relay distributed unit 72A, or each of mobile termination unit 70A and distributed unit 72A may comprise one or more relay node processor(s) 74A. The relay node distributed unit 72A may comprise transceiver circuitry 76, which in turn may comprise transmitter circuitry 77 and receiver circuitry 78. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment.

FIG. 17 further illustrates that IAB-node 24A may comprise radio condition detector 96 and notification generator 98. Both condition detector 96 and notification generator 98 may be realized or comprised by relay node processor(s) 74. The notification generator 98 serves to generate the condition notification 42, based on a condition detected by condition detector 96.

It should be understood that, although not illustrated in FIG. 17, the wireless access node 22-2 and IAB-node 24B of FIG. 16 and of FIG. 17 may have similar components and functionalities as the wireless access node 22-1 and IAB-node 24A, respectively, but with differently numbered/alphabetized suffixes denoting comparable components.

FIG. 17 shows child node 30 as comprising, in an example, non-limiting embodiment and mode, transceiver circuitry 86. The transceiver circuitry 86 in turn may comprise transmitter circuitry 87 and receiver circuitry 88. The transceiver circuitry 76 includes antenna(e) for the wireless transmission. Transmitter circuitry 77 may include, e.g., amplifier(s), modulation circuitry and other conventional transmission equipment. Receiver circuitry 78 may comprise, e.g., amplifiers, demodulation circuitry, and other conventional receiver equipment. FIG. 17 further shows child node 30, which (as indicated before) may be a user equipment or Integrated Access and Backhaul (IAB) node, as also comprising node processor circuitry, e.g., one or more node processor(s) 90, and interfaces 92, including one or more user interfaces. Such user interfaces may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

In an example, non-limiting embodiment and mode shown in FIG. 17, the child node 30 may include frame/message generator/handler 94; path controller 196; and report generator 198. As is understood by those skilled in the art, in some telecommunications system messages, signals, and/or data are communicated over a radio or air interface using one or more "resources", e.g., "radio resource(s)". The frame/message generator/handler 94 serves to handle messages, signals, and data received from other nodes, including but not limited to incoming messages such as the plural path activation message 140 and condition notification 42 described herein, as well as outgoing messages such as a report message 199 generated by report generator 198. The path controller 196 works in conjunction with establishing, activating, and de-activating signaling data paths in which child node 30 participates, such as first signaling data path SRB_f and second signaling data path SRB_s.

In a most basic example embodiment and mode, a wireless access node of the technology disclosed herein transmits at least one message which activates a first signaling data path and a second signaling data path. The first signaling data path, e.g., first signaling data path SRB_f, and the second signaling data path, e.g., second signaling data path SRB_s, are both established between the wireless access node, e.g., wireless access node 22-1, and the wireless terminal, e.g., child node 30. Signaling data on the first signaling data path is relayed by a wireless relay node, e.g., IAB-node 24A. In a most basic example embodiment and mode of the technology disclosed herein, the wireless terminal, e.g., child node 30, receives such message. Further, the child node 30 may, as a condition on the first signaling data path SRB_f arises, processes a notification received from the wireless relay node and, upon reception of the notification, transmit a report message to the wireless access node on the second signaling data path. The report message comprises information based on the notification, and the notification is based on a radio condition detected on the first signaling data path.

Figure 18:
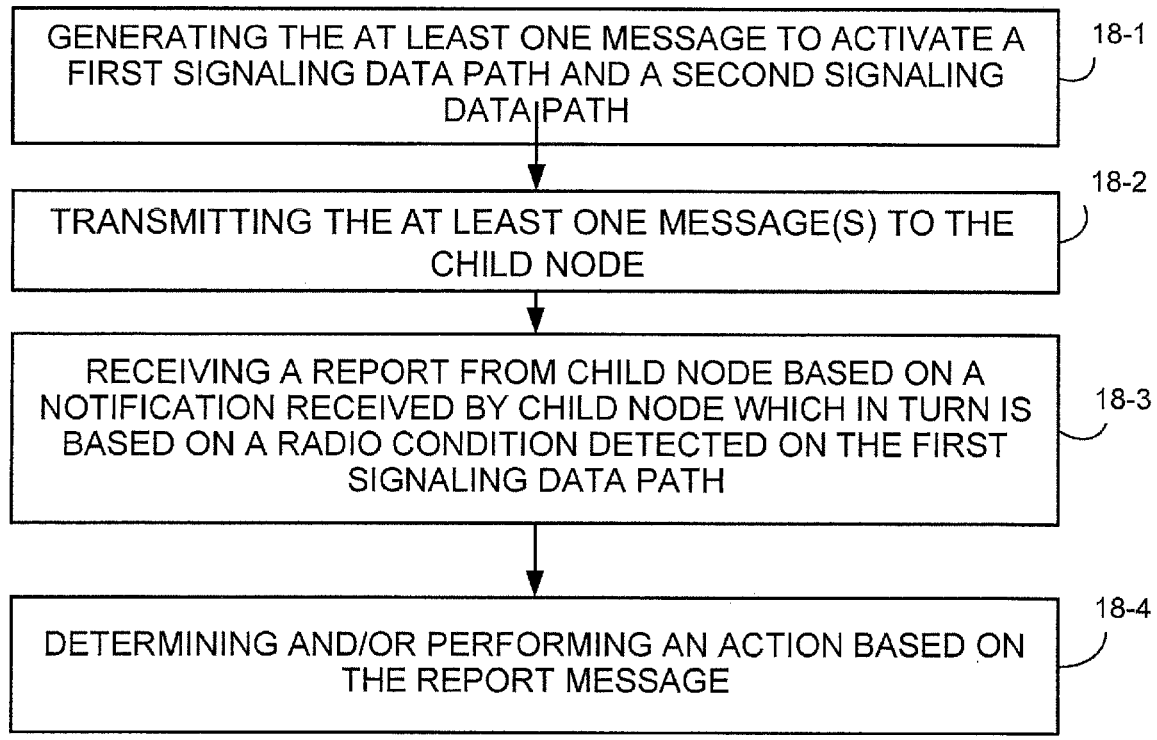
FIG. 18 is a flowchart showing example, non-limiting, basic acts or steps that may be performed by a wireless access node of FIG. 16.

Beyond the basic example embodiment and mode mentioned above, FIG. 18 shows further example, non-limiting, basic acts or steps that may be performed by the wireless access node 22-1 of FIG. 16 and FIG. 17. FIG. 18 is a flowchart illustrating example, non-limiting, basic acts or steps that may be performed by a wireless access node illustrated in FIG. 16. As illustrated in FIG. 18, Act 18-1 comprises generating the at least one message, e.g., the message(s) being configured to activate a first signaling data path and a second signaling data path. As mentioned above, the first signaling data path and the second signaling data path are established between the wireless access node and the wireless terminal, and the signaling data on the second signaling data path is relayed by a wireless relay node. The message(s) of act 18-1, which may be termed as the plural path activation message(s) 140, may be generated by message generator 60. Act 18-2 comprises transmitting the at least one message(s), e.g., the plural path activation message 140, to the child node 30. The plural path activation message 140 may be transmitted by the transmitter circuitry 57 of wireless access node 22-1.

A problematic condition may thereafter arise, and for sake of example is illustrated herein as a radio link failure occurring on first signaling data path SRB_f. Act 18-3 comprises the wireless access node 22-1 receiving a report from child node 30, and in particular receiving a report message comprising information based on a notification received by child node 30. The notification is preferably based on a radio condition detected on the first signaling data path. Such notification may be the condition notification 42 described herein. The report message, e.g., report message 199, may be received by receiver circuitry 58 and handled by report handler 163. Act 18-4 comprises determining and/or performing an action based on the report message. An example of such an action for act 18-4 may be, for example, deactivating the first signaling data path SRB_f.

Figure 19:
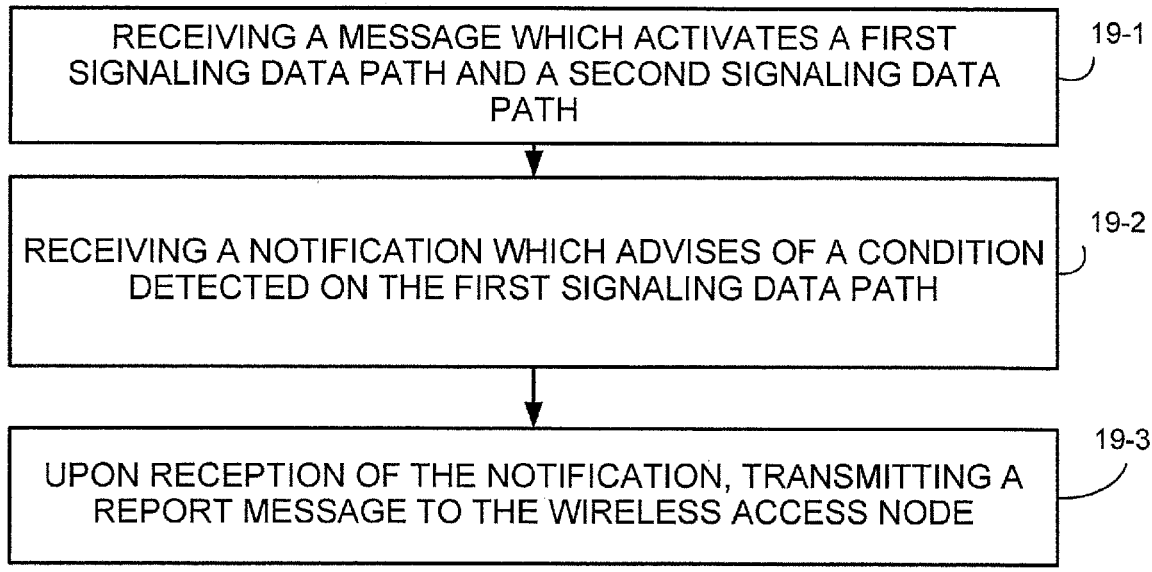
FIG. 19 is a flowchart showing example, non-limiting, basic acts or steps that may be performed by a child node of FIG. 16.

Beyond the basic example embodiment and mode mentioned above, FIG. 19 illustrates further example, non-limiting, basic acts or steps that may be performed by child node 30 of FIG. 16 and FIG. 17. FIG. 19 is a flowchart illustrating example, non-limiting, basic acts or steps that may be performed by a child illustrated in FIG. 16. As illustrated in FIG. 19, Act 19-1 comprises receiving a message which activates a first signaling data path and a second signaling data path, e.g., the first signaling data path SRB_f and the second signaling data path SRB_s. Act 19-2 comprises receiving a notification of a condition detected on the first signaling data path SRB_f. The message of act 19-1 may be the plural path activation message 140 described herein, generated by wireless access node 22-1; the message of act 19-2 may be the condition notification 42 described herein, generated by IAB-node 24A. The messages of both act 19-1 and act 19-2 may be received through receiver circuitry 88 and processed by frame/message generator/handler 94. Act 19-3 comprises, upon reception of the notification of act 19-2, transmitting a report message to the wireless access node. The report message comprises information based on the notification; the notification is based on a radio condition detected on the first signaling data path.

In an example scenario illustrated in FIG. 16, child node 30, e.g., Child Node 1, which may be an IAB-node or a UE, establishes redundant connections (i.e. multiple connections or simultaneous connections, such as Dual Connectivity (DC)) for at least the signaling radio bearer (SRB) (and possibly the data radio bearers (DRBs) as well). As illustrated in FIG. 16, the SRB may be carried by two (or more) separate paths: (1) signaling data path SRB_f which includes wireless access node 22-1, IAB-node 24A, and child node 30, e.g., Donor 1—Node A—Child Node 1 (SRB and (2) signaling data path SRB_s which involves wireless access node 22-1, wireless access node 22-2, IAB-node 24B, and 30, e.g., Donor 1-Donor2-Node B—Child Node 1 (SRB_s). In one configuration, the wireless access node 22-1, e.g., Donor 1, may act as a master node while wireless access node 22-2, e.g., Donor 2, may behave as a secondary (or slave) node. In another configuration, the wireless access node 22-1, e.g., Donor 1, may act as a secondary (or slave) node while wireless access node 22-2, e.g., Donor 2, may behave as a master node. In one configuration, signaling data may duplicated and transmitted on the multiple paths, e.g., on first signaling data path SRB_f and second signaling data path SRB_s. In another configuration, packets for signaling data are split into the two paths, e.g., first signaling data path SRB_f and second signaling data path SRB_s, for increased throughput.

After establishing an RRC connection to wireless access node 22-1, e.g., to Donor 1, the Child Node 30 may be provisioned with a configuration with a secondary cell served by the wireless access node 22-2 and IAB-node 24B. Following the configuration, the Child Node 30 may use the multiple paths for transmitting/receiving signaling bearer (and possibly data bearers). In the present example embodiment and mode, at least one of the parent nodes of the Child node 30 may send some of the aforementioned notifications representing the radio condition of its upstream radio link. That is, either IAB-node 24A or IAB-node 24B may send such notifications as and when the radio condition(s) occur. For example, similar to the previously disclosed embodiments, when detecting a radio link failure (RLF) on the upstream radio link of IAB-node 24A, the IAB-node 24A may send the Upstream RLF notification to its child nodes including the Child Node 30. In this case, the Child Node 30 may attempt to report this event to at least one of the serving donors using a path not affected by the RLF. In the scenario shown in the FIG. 16, the Child Node 30 may use the path SRB_s to send the report to the wireless access node 22-2 through the IAB-node 24B. In some example configurations, the report may be also conveyed to the wireless access node 22-1, e.g., to Donor 1, which may decide to reconfigure updated redundant connections to the Child Node 30.

Figure 20A:
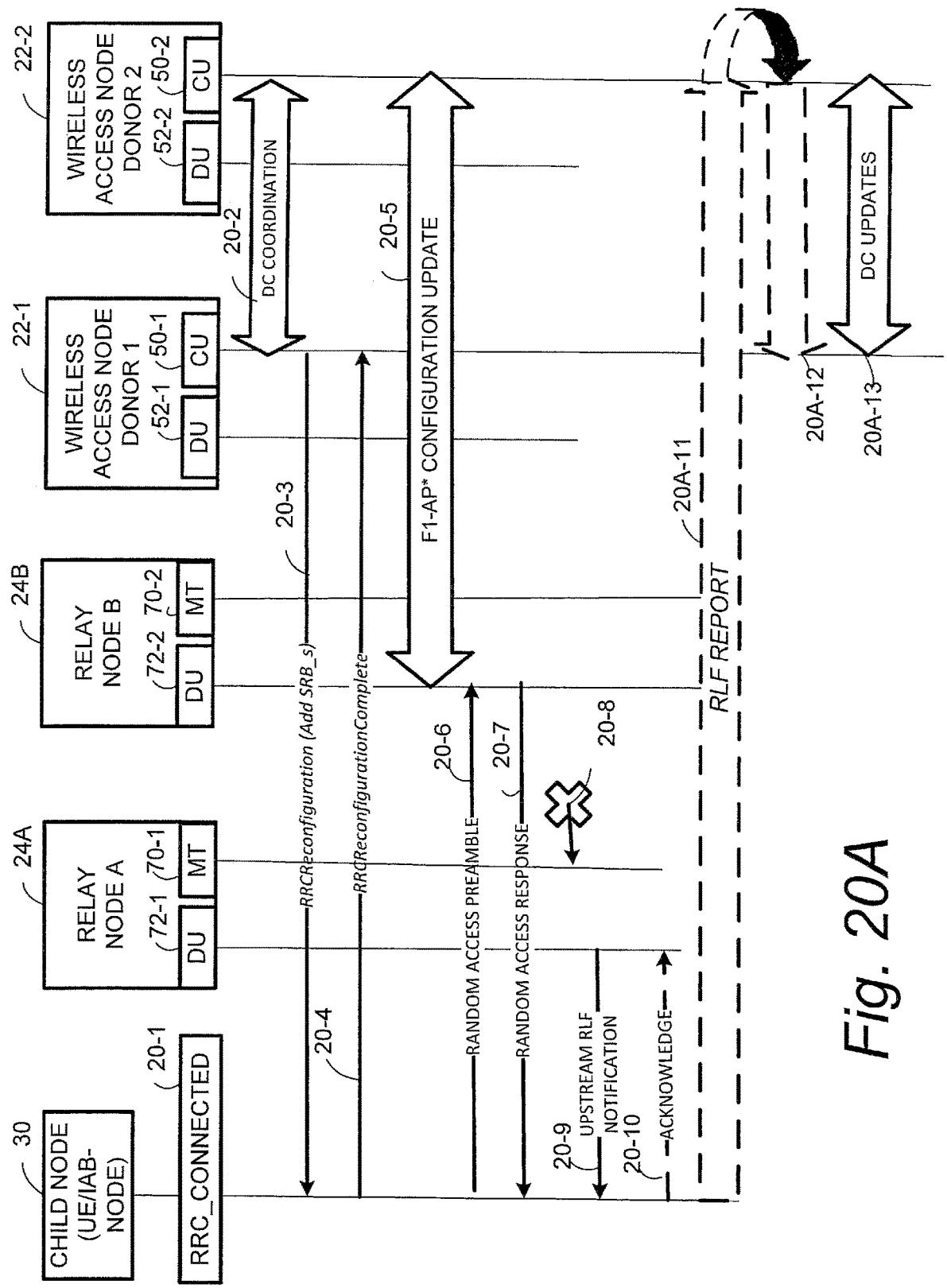
FIG. 20A depicts example, basic, representative acts or steps of a message flow for a first example system scenario shown in FIG. 16.

FIG. 20A illustrates example, basic, representative acts or steps of message flow for a first example system scenario illustrated in FIG. 16. As illustrated in FIG. 20A, the Child Node 30 may first establish an RRC connection with the Donor 1, which results in setting up the SRB_f. FIG. 20A illustrates example, basic, representative acts or steps of message flow for a first example system scenario illustrated in FIG. 16. As illustrated in FIG. 20A, the Child node 30 is in RRC_CONNECTED (depicted as act 20-1 in FIG. 20A), the wireless access node 22-1 may decide to configure an additional connection and, as represented by act 20-2, start a coordination with wireless access node 22-2. It should be noted that, similar to the previously disclosed embodiment, the wireless access node 22-1 and the wireless access node 22-2 may be physically collocated or separated entities, or even the same entity. As act 20-3 wireless access node 22-1 may send to the Child Node 30 RRCReconfiguration comprising a configuration to add a new SRB (SRB_s) and an identity of the cell to serve SRB_s, the identity of the cell served by IAB-node 24B. As act 20-Child Node 30 may then acknowledge to RRCReconfiguration by sending a RRCReconfigurationComplete message. As act 20-5 wireless access node 22-2 may use F1-AP* to update the routing configurations at the Node B, e.g., at IAB-node 24B, for the Child Node 30.

As act 20-6 the child node 30 may initiate a random access procedure by sending a Random Access Preamble message, and as act 20-7 may receive a Random Access Response message. The random access procedure of act 20-6 and act 20-7 serves to synchronize child node 30 to the IAB-node 24B.

Eventually, as act 20-8, IAB-node 24A may detect a specified radio condition on its upstream link. In the example scenario shown in FIG. 20A, the specified upstream condition may be a radio link failure (RLF), but could be other radio link condition(s) as well. Act 20-9 comprises IAB-node 24A sending a notification, e.g., condition notification 42, to child node 30. In the example scenario shown in FIG. 20A, in which the specified upstream condition may be a radio link failure (RLF), the condition notification 42 may be an Upstream RLF notification which may be sent to child nodes/UEs of IAB-node 24A, including but not necessarily limited to Child Node 30. As act 20-10 Child Node 30 may send back an acknowledgement of the condition notification 42 to IAB-node 24A. Further, upon receipt of the notification of act 20-9, e.g., upon receipt of condition notification 42, as act 20-11 the child node 30 may generate and transmit a report message reporting the RLF occurring on the path for SRB_f. The report message 199 may be generated by report generator 198 upon receipt of the condition notification 42.

In one example embodiment and mode shown in FIG. 20A, the report message of act 20-11 is an RRC message of act 20-11 directed to the Donor 1, e.g., to wireless access node 22-1. As Act 20A-12, the Donor 2, e.g., wireless access node 22-2, may transfer the report message to the Donor 1 using an inter-node message on the wired backhaul link 32. Upon receipt of the report message, the Donor 1 may coordinate with the Donor 2 to deactivate the problematic signaling data path (e.g. the first signaling data path SRB_f), as shown in Act 20A-13. In one implementation, the wireless access node 22-1 aka Donor 1, now recognizing that SRB_f is torn down, may reconfigure the Child Node 30 with a new SRB configuration, e.g. releasing SRB_f. by sending another RRCReconfiguration. In parallel, wireless access node 22-1 may also use the F1-AP* to update the routing configuration of the Child Node 30, if the Child Node 30 is an IAB-node.

Figure 20B:
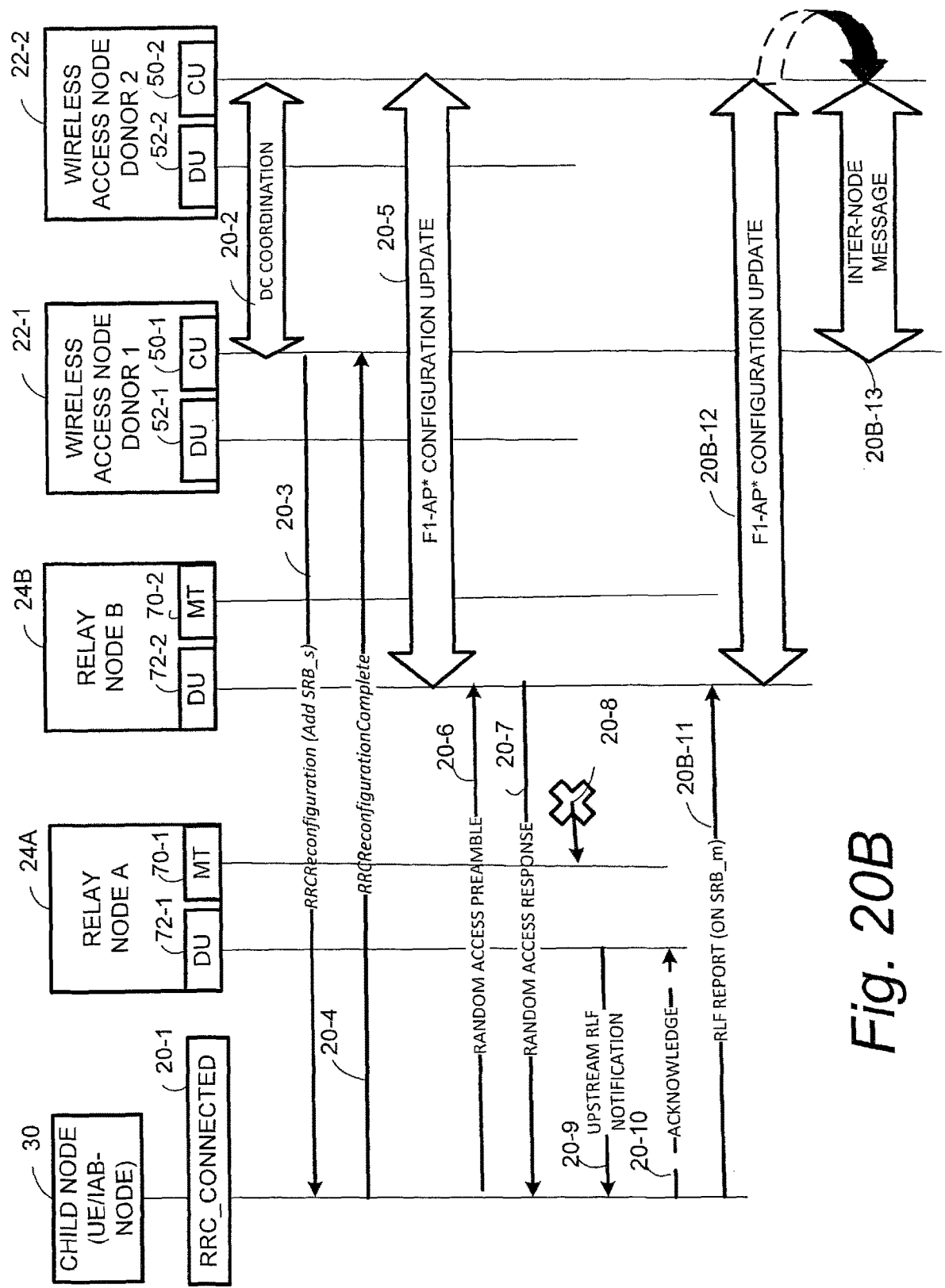
FIG. 20B depicts example, basic, representative acts or steps of a message flow for a first example system scenario shown in FIG. 16.

FIG. 20B illustrates example, basic, representative acts or steps of message flow for a first example system scenario illustrated in FIG. 16. As illustrated in FIG. 20B, the report message 42 of act 20B-11 is addressed to the parent node, e.g., IAB-node 24B using the Adaptation Layer, the RLC Layer, the MAC Layer or the physical layer signaling. Then, as act 20B-12, the parent node IAB-node 24B may convey the report message using a protocol, e.g., F1-AP*, to the Donor 2, e.g., to wireless access node 22-2. As act 20B-13 the wireless access node 22-2 may redirect the report message to the Donor 1, e.g., wireless access node 22-1, using an inter-node message on the wired backhaul link 32. Similar to the previous embodiment and mode shown in FIG. 20A, in one implementation, the wireless access node 22-1 aka Donor 1, now recognizing that SRB_f is torn down, may reconfigure the Child Node 30 with a new SRB configuration, e.g. releasing SRB_f. by sending another RRCReconfiguration. In parallel, wireless access node 22-1 may also use the F1-AP* to update the routing configuration of the Child Node 30, if the Child Node 30 is an IAB-node.

In either the example embodiment and mode of FIG. 20A or the example embodiment and mode of FIG. 20B, upon receipt of the report message 199 the wireless access node 22-1 may take appropriate action, such as for example, deactivating the first signaling data path SRB_f.

In one example embodiment and mode, the Child Node is preconfigured to send the report message upon receiving one of designated notifications from the parent node, e.g., from IAB-node 24A. In another example embodiment and mode, the Child Node is configured by an IAB-donor node to send the report message upon receiving one of designated notifications. In this latter case, RRCReconfiguration may be used to configure the designated notifications for sending report message.

Accordingly, in the example embodiment and mode of FIG. 16-FIG. 20A and FIG. 20B, an IAB-node or a UE configured with multiple radio paths for the signaling radio bearer(s) may receive from one parent node a notification representing the radio condition of the upstream radio link of one of the parent nodes. The IAB-node or the UE may use one or more other radio paths to send a report message reporting the radio condition to at least one IAB-donor node. The IAB-donor node that receives the report message may initiate reconfiguration for updated topology and/or routing of the relay network accordingly.

The system of IAB is expected to be reliable and robust against various kinds of possible failures. The technology disclosed herein thus provides methods and procedures to deal with a radio link failure on the backhaul link.

The technology disclosed herein provides methods for handling cases where an LAB node loses the connection to the network due to a radio link failure. Example, non-limiting methods and features include:

The IAB node transmits to its child nodes/UEs information representing the radio condition of its upstream link.

The child nodes/UEs decide, based on the received information, whether or not to stay on the current serving IAB node or reselect another cell/IAB node.

The child nodes/UEs may wait for a designated duration before making the decision, expecting that the serving IAB node recovers the upstream radio link during the duration.

The child nodes/UEs may be configured with a conditional handover that allows an autonomous handover when its parent node suffered from a designated radio condition on its upstream link.

The child nodes/UEs may be configured with multiple signaling paths and may report a designated radio condition occurring on one of the paths using one of the remaining paths.

Certain units and functionalities of the systems 20 may be implemented by electronic machinery. For example, electronic machinery may refer to the processor circuitry described herein, such as node processor(s) 54, relay node processor(s) 74, and node processor(s) 90. Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites.

Figure 21:
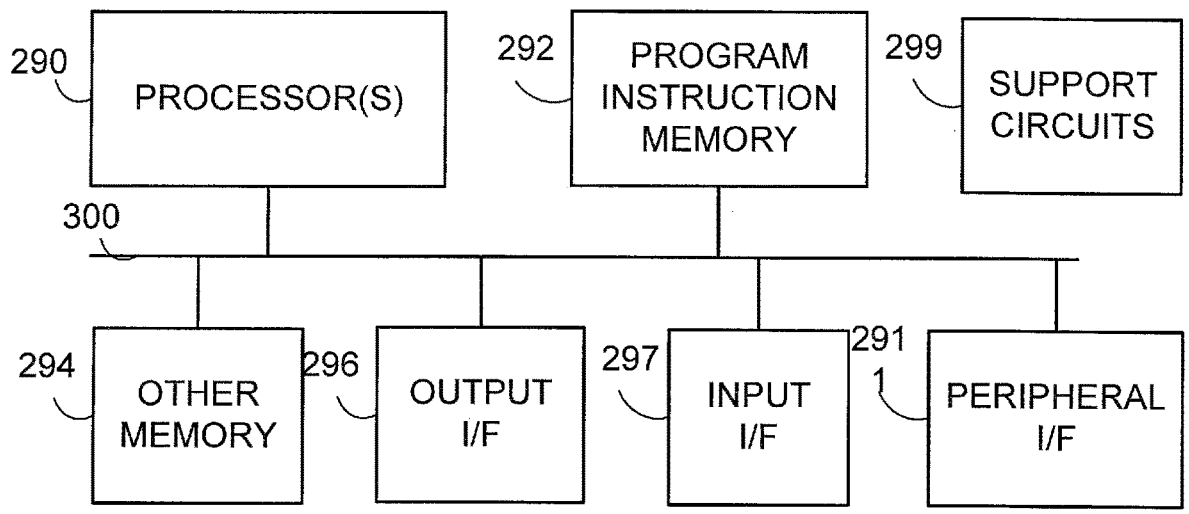
FIG. 21 is a diagrammatic view showing example elements comprising electronic machinery which may comprise a wireless terminal, a radio access node, and a core network node according to an example embodiment and mode.
Figure 22:
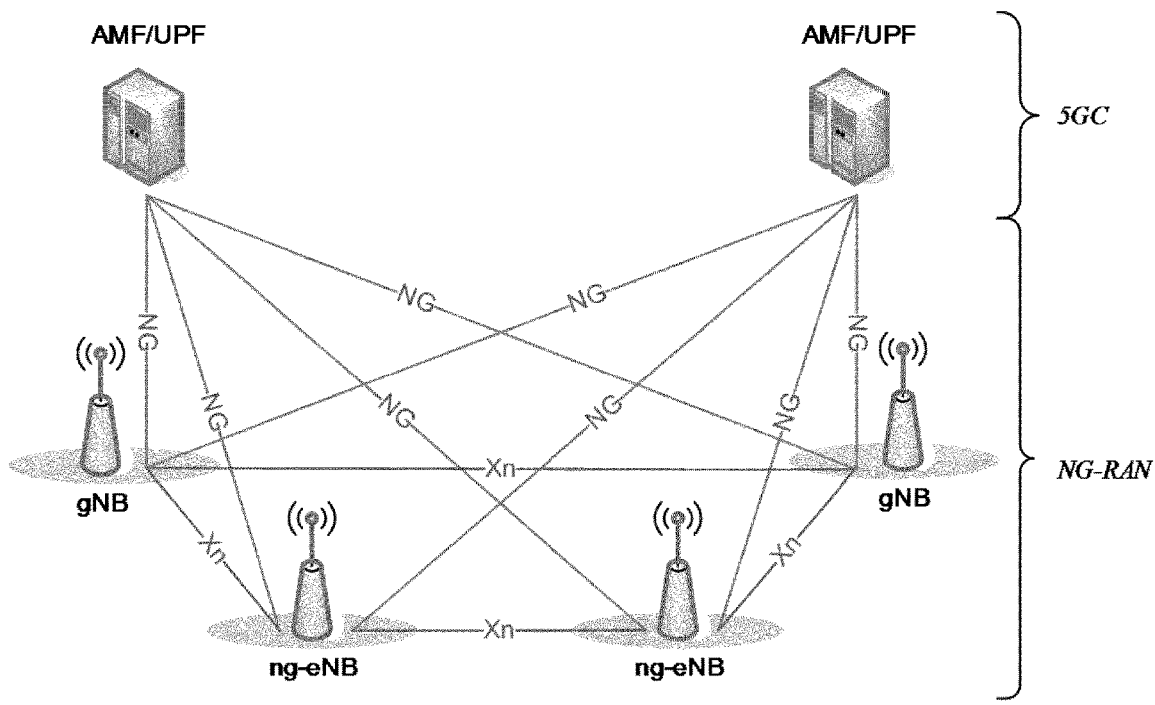
FIG. 22 is a diagrammatic view illustrating overall architecture for a 5G New Radio system.

FIG. 21 is a diagrammatic view illustrating example elements comprising electronic machinery which may comprise a wireless terminal, a radio access node, and a core network node according to example embodiments and modes. FIG. 21 illustrates an example of electronic machinery, e.g., processor circuitry, as comprising one or more processors 290, program instruction memory 292; other memory 294 (e.g., RAM, cache, etc.); input/output interfaces 296 and 297, peripheral interfaces 291; support circuits 299; and busses 300 for communication between the aforementioned units. The processor(s) 290 may comprise the processor circuitries described herein, for example, node processor(s) 54, relay node processor(s) 74, and node processor(s) 90.

A memory or register described herein may be depicted by memory 294, or any computer-readable medium, may be one or more of readily available memory such as random access memory (RAM), read only memory (ROM), floppy disk, hard disk, flash memory or any other form of digital storage, local or remote, and is preferably of non-volatile nature, and as such may comprise memory. The support circuits 299 are coupled to the processors 290 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 30 and radio access network 24 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves basic function of a radio access network, e.g., methods and procedures to deal with problematic conditions on a backhaul link, such as radio link failure (RLF), for example.

The technology disclosed herein encompasses one or more of the following non-limiting, non-exclusive example embodiments and modes:

Example Embodiment 1: A wireless access node of a radio access network (RAN) that communicates over a radio interface with a wireless terminal through at least one wireless relay node, the wireless access node comprising: transmitter circuitry configured to transmit a message to the wireless terminal; wherein the message comprises information configured to facilitate a conditional handover of the wireless terminal, the information comprising at least one identity of a target cell and one or more conditions for the wireless terminal performing the conditional handover autonomously, the conditions including a reception of a notification from the wireless relay node.

Example Embodiment 2: The wireless access node of Example Embodiment 1, further comprising processor circuitry configured to generate the message.

Example Embodiment 3: The wireless access node of Example Embodiment 2, wherein the processor circuitry is configured to initiate a handover coordination with the wireless access node that serves the target cell upon occurrence of a predetermined event.

Example Embodiment 4: The wireless access node of Example Embodiment 2, further comprising receiver circuitry which is configured to receive a measurement report from the wireless terminal, the measurement report including a measurement regarding a signal received by the wireless terminal from the wireless access node that serves the target cell.

Example Embodiment 5: The wireless access node of Example Embodiment 1, wherein the message is a reconfiguration message.

Example Embodiment 6: The wireless access node of Example Embodiment 1, wherein the notification represents a radio condition.

Example Embodiment 7: The wireless access node of Example Embodiment 6, wherein the radio condition is detected on a radio link located between the wireless access node and the wireless relay node.

Example Embodiment 8: The wireless access node of Example Embodiment 6, wherein the radio condition comprises a radio link failure.

Example Embodiment 9: The wireless access node of Example Embodiment 6, wherein the radio condition comprises a value of a signal quality.

Example Embodiment 10: The wireless access node of Example Embodiment 1, wherein the notification is carried via a signal of Adaptation layer Example Embodiment 11: The wireless access node of Example Embodiment 11, wherein the notification is carried via a signal of Radio Link Control (RLC) layer.

Example Embodiment 12: The wireless access node of Example Embodiment 1, wherein the notification is carried via a signal of Medium Access Control (MAC) layer.

Example Embodiment 13: The wireless access node of Example Embodiment 1, wherein the notification is carried via a physical layer signal.

Example Embodiment 14: The wireless access node of Example Embodiment 1, further comprising a receiver circuitry configured to receive a handover complete message from the wireless terminal, the handover complete message indicating that the wireless terminal has completed the handover.

Example Embodiment 15: A method in a wireless access node of a radio access network (RAN) that communicates over a radio interface with a wireless terminal through at least one wireless relay node, the method comprising: transmitting a message to the wireless terminal; wherein the message comprises information configured to facilitate a conditional handover of the wireless terminal, the information comprises at least one identity of a target cell and one or more conditions for the wireless terminal performing the conditional handover autonomously, the conditions including a reception of a notification from the wireless relay node.

Example Embodiment 16: The method of Example Embodiment 15, further comprising using processor circuitry to generate the conditional handover preauthorization message.

Example Embodiment 17: The method of Example Embodiment 15, further comprising initiating a handover coordination with the wireless access node that serves the target cell upon occurrence of a predetermined event.

Example Embodiment 18: The method of Example Embodiment 17, further comprising receiving a measurement report from the wireless terminal, the measurement report including a measurement regarding a signal received by the wireless terminal from the wireless access node that serves the target cell.

Example Embodiment 19: The method of Example Embodiment 15, wherein the message is a reconfiguration message.

Example Embodiment 20: The method of Example Embodiment 15, wherein the notification represents a radio condition.

Example Embodiment 21: The method of Example Embodiment 20, wherein the radio condition is detected on a radio link located between the wireless access node and the wireless relay node.

Example Embodiment 22: The method of Example Embodiment 20, wherein the radio condition comprises a radio link failure.

Example Embodiment 23: The method of Example Embodiment 20, wherein the radio condition comprises a value of a signal quality.

Example Embodiment 24: The method of Example Embodiment 15, wherein the notification is carried via a signal of Adaptation layer.

Example Embodiment 25: The method of Example Embodiment 15, wherein the notification is carried via a signal of Radio Link Control (RLC) layer.

Example Embodiment 26: The method of Example Embodiment 15, wherein the notification is carried via a signal of Medium Access Control (MAC) layer.

Example Embodiment 27: The method of Example Embodiment 15, wherein the notification is carried via a physical layer signal.

Example Embodiment 28: The method of Example Embodiment 15, further comprising receiving a handover complete message from the wireless terminal, the handover complete message indicating that the wireless terminal has completed the handover.

Example Embodiment 29: A wireless terminal that communicates over a radio interface with a wireless access node of a radio access network (RAN) through at least one wireless relay node, the wireless terminal comprising: receiver circuitry configured to receive a message from the wireless access node; wherein the message comprises information configured to facilitate a conditional handover of the wireless terminal, the information comprising at least one identity of a target cell and one or more conditions for the wireless terminal performing the conditional handover autonomously, the conditions including a reception of a notification from the wireless relay node.

Example Embodiment 30: The wireless terminal of Example Embodiment 29, further comprising processor circuitry configured to: obtain the information from the message; determine whether the one or more conditions occur; and upon occurrence of the one or more conditions, autonomously initiate a handover to the target cell.

Example Embodiment 31: The wireless terminal of Example Embodiment 29, further comprising transmitter circuitry configured to generate a handover complete message to the wireless access node that serves the target cell.

Example Embodiment 32: The wireless terminal of Example Embodiment 29, further comprising processor circuitry configured to: obtain the information from the message; upon receipt of the notification, autonomously initiate a handover to the target cell.

Example Embodiment 33: The wireless terminal of Example Embodiment 32, further comprising transmitter circuitry configured to generate a handover complete message to the wireless access node that serves the target cell.

Example Embodiment 34: The wireless terminal of Example Embodiment 29, wherein the message is a reconfiguration message.

Example Embodiment 35: The wireless terminal of Example Embodiment 29, wherein the receiver circuitry is further configured to receive the notification message from the wireless relay node, the notification representing a radio condition detected by the wireless relay node.

Example Embodiment 36: The wireless terminal of Example Embodiment 29, wherein the radio condition is detected on a radio link located between the wireless access node and the wireless relay node.

Example Embodiment 37: The wireless terminal of Example Embodiment 29, wherein the radio condition comprises a radio link failure.

Example Embodiment 38: The wireless terminal of Example Embodiment 29, wherein the radio condition comprises a value of a signal quality.

Example Embodiment 39: The wireless terminal of Example Embodiment 29, wherein the notification is carried via a signal of Radio Link Control (RLC) layer.

Example Embodiment 40: The wireless terminal of Example Embodiment 29, wherein the notification is carried via a signal of Medium Access Control (MAC) layer.

Example Embodiment 41: The wireless terminal of Example Embodiment 29, wherein the notification is carried via a physical layer signal.

Example Embodiment 42: The wireless terminal of Example Embodiment 29, further comprising transmitter circuitry configured to transmit a handover complete message to the wireless access node that serves the target cell, the handover complete message indicating that the wireless terminal has completed the handover.

Example Embodiment 43: A method in a wireless terminal that communicates over a radio interface with a wireless access node of a radio access network (RAN) through at least one wireless relay node, the method comprising: receiving a message from the wireless access node; wherein the message comprises information configured to facilitate a conditional handover of the wireless terminal, the information comprising at least one identity of a target cell and one or more conditions for the wireless terminal performing the conditional handover autonomously, the conditions including a reception of a notification from the wireless relay node.

Example Embodiment 44: The method of Example Embodiment 43, further comprising using processor circuitry to: obtain the information from the message; determine whether the one or more conditions occur; and upon occurrence of the one or more conditions, autonomously initiate a handover to another wireless access node.

Example Embodiment 45: The method of Example Embodiment 44, further comprising using transmitting circuitry to generate a handover complete message to the wireless access node that serves the target cell.

Example Embodiment 46: The method of Example Embodiment 43, further comprising using processor circuitry to: obtain the information from the message; upon receipt of the notification, autonomously initiate a handover to another wireless access node.

Example Embodiment 47: The method of Example Embodiment 46, further comprising transceiver circuitry configured to generate a handover complete message to the wireless access node that serves the target cell.

Example Embodiment 48: The method of Example Embodiment 43, wherein the message is a reconfiguration message.

Example Embodiment 49: The method of Example Embodiment 43, further comprising receiving the notification message from the wireless relay node, the notification representing a radio condition detected by the wireless relay node.

Example Embodiment 50: The method of Example Embodiment 43, wherein the radio condition is detected on a radio link located between the wireless access node and the wireless relay node.

Example Embodiment 51: The method of Example Embodiment 43, wherein the radio condition comprises a radio link failure.

Example Embodiment 52: The method of Example Embodiment 43, wherein the radio condition comprises a value of a signal quality.

Example Embodiment 53: The method of Example Embodiment 43, further comprising receiving the notification via a signal of Radio Link Control (RLC) layer.

Example Embodiment 54: The method of Example Embodiment 43, further comprising receiving the notification via a signal of Medium Access Control (MAC) layer.

Example Embodiment 55: The method of Example Embodiment 43, further comprising receiving the notification via a physical layer signal.

Example Embodiment 55: The method of Example Embodiment 43, further comprising receiving the notification via a physical layer signal.

Example Embodiment 56: The method of Example Embodiment 43, further comprising transmitting a handover complete message to the wireless access node that serves the target cell, the handover complete message indicating that the wireless terminal has completed the handover.

Example Embodiment 57: A wireless access node of a radio access network (RAN) that communicates over a radio interface with a wireless terminal, the wireless access node comprising: transmitter circuitry configured to transmit at least one message to the wireless terminal, the at least one message being configured to activate a first signaling data path and a second signaling data path, the first signaling data path and the second signaling data path being established between the wireless access node and the wireless terminal, signaling data on the first signaling data path being relayed by a wireless relay node; receiver circuitry configured to receive a report message from the wireless terminal on the second data path; wherein the report message comprises information based on a notification representing a radio condition detected on the first signaling data path.

Example Embodiment 58: The wireless access node of Example Embodiment 57, further comprising processor circuitry configured to generate the at least one message.

Example Embodiment 59: The wireless access node of Example Embodiment 57, wherein the at least one message comprises a reconfiguration message.

Example Embodiment 60: The wireless access node of Example Embodiment 57, wherein the notification is sent from the wireless relay node to the wireless terminal.

Example Embodiment 61: The wireless access node of Example Embodiment 57, wherein the radio condition is detected on a radio link located between the wireless access node and the wireless relay node.

Example Embodiment 62: The wireless access node of Example Embodiment 61, wherein the radio condition comprises a radio link failure.

Example Embodiment 63: The wireless access node of Example Embodiment 61, wherein the radio condition comprises a value of a signal quality.

Example Embodiment 64: The wireless access node of Example Embodiment 57, further comprising processor circuitry configured to determine an action based on the report message.

Example Embodiment 65: The wireless access node of Example Embodiment 64, wherein the action comprises deactivating the first signaling data path.

Example Embodiment 66: The wireless access node of Example Embodiment 57, wherein the report message comprises a Radio Resource Control (RRC) message.

Example Embodiment 67: A method in a radio access network (RAN) that communicates over a radio interface with a wireless terminal, the method comprising: transmitting at least one message to the wireless terminal, the at least one message activating a first signaling data path and a second signaling data path, the first signaling data path and the second signaling data path being established between the wireless access node and the wireless terminal, signaling data on the first signaling data path being relayed by a wireless relay node; receiving a report message from the wireless terminal on the second data path; and wherein the report message comprises information based on the notification, and the notification is based on a radio condition detected on the first signaling data path.

Example Embodiment 68: The method of Example Embodiment 67, further comprising using processor circuitry to generate the at least one message.

Example Embodiment 69: The method of Example Embodiment 67, wherein the at least one message comprises a reconfiguration message.

Example Embodiment 70: The method of Example Embodiment 67, wherein the radio condition is detected on a radio link located between the wireless access node and the wireless relay node.

Example Embodiment 71: The method of Example Embodiment 70, wherein the radio condition comprises a radio link failure.

Example Embodiment 72: The method of Example Embodiment 70, wherein the radio condition comprises a value of a signal quality.

Example Embodiment 73: The method of Example Embodiment 67, further comprising determining an action based on the report message.

Example Embodiment 74: The method of Example Embodiment 73, wherein the action comprises deactivating the first signaling data path.

Example Embodiment 75: The method of Example Embodiment 67, wherein the report message comprises a Radio Resource Control (RRC) message.

Example Embodiment 76: A wireless terminal that communicates over a radio interface with a wireless access node of a radio access network (RAN), the wireless terminal comprising: receiver circuitry configured to receive from the wireless access node at least one message, the at least one message being configured to activate a first signaling data path and a second signaling data path, the first signaling data path and the second signaling data path being established between the wireless access node and the wireless terminal, signaling data on the first signaling data path being relayed by a wireless relay node; processor circuitry configured to process a notification received from the wireless relay node; transmitter circuitry configured to transmit, based on a reception of the notification, a report message to the wireless access node; wherein the report message comprises information based on the notification, and the notification is based on a radio condition detected on the first signaling data path.

Example Embodiment 77: The wireless terminal of Example Embodiment 76, wherein the processor circuitry is further configured to generate the report message.

Example Embodiment 78: The wireless terminal of Example Embodiment 76, wherein the radio condition is detected on a radio link located between the wireless access node and the wireless relay node.

Example Embodiment 79: The wireless terminal of Example Embodiment 76, wherein the radio condition comprises a radio link failure.

Example Embodiment 80: The wireless terminal of Example Embodiment 76, wherein the radio condition comprises a value of a signal quality.

Example Embodiment 81: The wireless terminal of Example Embodiment 76, wherein the receiver circuitry is further configured to receive from the wireless access node an instruction based on the report message.

Example Embodiment 82: The wireless terminal of Example Embodiment 76, wherein the instruction comprises deactivating the first signaling data path.

Example Embodiment 83: The wireless terminal of Example Embodiment 76, wherein the report message comprises a Radio Resource Control (RRC) message.

Example Embodiment 84: A method in a wireless terminal that communicates over a radio interface with a wireless access node of a radio access network (RAN), the method comprising: receiving from the wireless access node at least one message, the at least one message being configured to activate a first signaling data path and a second signaling data path, the first signaling data path and the second signaling data path being established between the wireless access node and the-wireless terminal, signaling data on the first signaling data path being relayed by a wireless relay node; processing a notification received from the wireless relay node; transmitting a report message to the wireless access node; wherein the report message comprises information based on the notification, and the notification is based on a radio condition detected on the first signaling data path.

Example Embodiment 85: The method of Example Embodiment 84, further comprising using processor circuitry to process the notification and to generate the report message.

Example Embodiment 86: The method of Example Embodiment 84, wherein the radio condition is detected on a radio link located between the wireless access node and the wireless relay node.

Example Embodiment 87: The method of Example Embodiment 86, wherein the radio condition comprises a radio link failure.

Example Embodiment 88: The method of Example Embodiment 86, wherein the radio condition comprises a value of a signal quality.

Example Embodiment 89: The method of Example Embodiment 84, further comprising receiving the notification via a signal of Radio Link Control (RLC) layer.

Example Embodiment 90: The method of Example Embodiment 84, further comprising receiving from the wireless access node an instruction based on the report message.

Example Embodiment 91: The method of Example Embodiment 90, wherein the instruction comprises deactivating the first signaling data path.

Example Embodiment 92: The method of Example Embodiment 84, wherein the report message comprises a Radio Resource Control (RRC) message.

One or more of the following documents may be pertinent to the technology disclosed herein (all of which are incorporated herein by reference in their entirety):

| | | |
|---|---|---|
| R2-1811058 | On the ST and DAG topologies for IAB | Samsung |
| R2-1811169 | SRB mapping options for IAB | Samsung |
| R2-1811170 | F1AP mapping options for IAB | Samsung |
| R2-1811418 | Route management in IAB | Sony |
| R2-1811419 | Open issues related to IAB power on procedure | Sony |
| R2-1811778 | IAB Topology and Routing Management | vivo |
| R2-1811779 | Selection of Parent for IAB-Node | vivo |
| R2-1811843 | Consideration of topology adaptation in IAB | Kyocera |
| R2-1811997 | IAB failure recovery as part of route management | Samsung R&D Institute UK |
| R2-1811998 | IAB topology and route management | Samsung R&D Institute UK |
| R2-1812056 | Initial link selection for IAB access | Lenovo, Motorola Mobility |
| R2-1812061 | Considerations on JAB multi-hop system | Lenovo, Motorola Mobility |
| R2-1812069 | Radio link failure of backhaul link | Lenovo, Motorola Mobility |
| R2-1812219 | Impact of not using SCTP for F1-AP | Ericsson |
| R2-1812220 | Setup of adaptation layer | Ericsson |
| R2-1812300 | IAB Topology Discovery for Routing and Topology Management | Nokia, Nokia Shanghai Bell |
| R2-1812301 | Measurements for IAB | Nokia, Nokia Shanghai Bell |
| R2-1812302 | Service interruption time minimization for backhaul links | Nokia, Nokia Shanghai Bell |
| R2-1812341 | Topology Adaptation Scenarios | Nokia, Nokia Shanghai Bell, Qualcomm Incorporated, Huawei, Ericsson |
| R2-1812346 | IAB Routing for Architecture 2a | Nokia, Nokia Shanghai Bell |
| R2-1812404 | Establishment of RLC Channels During and After IAB Node Integration for Architecture Group 1 | AT&T |

| | | |
|---|---|---|
| R2-1812405 | Route Changes based on Intra-gNB Handover of IAB Node | AT&T |
| R2-1812464 | Discussion on UE bearer setup procedure in IAB network | ZTE Corporation |
| R2-1812467 | Discussion on IAB link switch and topology adaptation | ZTE Corporation |
| R2-1812468 | Discussion on IAB node discovery and selection | ZTE Corporation |
| R2-1812469 | Consideration on Routing in IAB Architecture 1a and 1b | ZTE Corporation |
| R2-1812470 | Control plane signaling delivery in NSA deployment | ZTE Corporation |
| R2-1812522 | Topology management for IAB | KT Corp. |
| R2-1812644 | Handling of wireless backhaul link problem | LG Electronics Inc. |
| R2-1812673 | The mobility in IAB | Potevio |
| R2-1812682 | Discussion for routing operation of IAB topologies | LG Electronics |
| R2-1812708 | Discussion on IAB topology adaptation with Tree and DAG topology | ITRI |
| R2-1812785 | Consideration on route selection | LG Electronics Inc. |
| R2-1812796 | Consideration on cell reselection of IAB | LG Electronics Inc. |
| R2-1812819 | Bearer mapping for control plane signaling in BH | Huawei Technologies France |
| R2-1812820 | Handling of the RLF on wireless backhaul link | LG Electronics Inc. |
| R2-1812827 | Access Control for IAB node | LG Electronics Inc. |
| R2-1812830 | Distributed RRC functions for IAB | Huawei Technologies France |
| R2-1812833 | Basic principles for IAB topology adaptation | Huawei Technologies France |
| R2-1812846 | Consideration on routing table update in IAB | ASUSTeK |
| R2-1812862 | Supporting Prioritization of F1-AP message | LG Electronics |
| R2-1812885 | Control Plane protocols for architecture group 1 | Huawei Technologies France |
| R2-1812889 | Consideration about the F1*-C | Huawei Technologies France |
| R2-1812892 | Destination Address and Forwarding Path based Routing for IAB | Huawei Technologies France |
| R2-1812893 | Support of multiple connectivity and fast link switch for IAB | Huawei Technologies France |
| R2-1813025 | Impact of not using SCTP for F1-AP | Ericsson |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

SUMMARY

In one example, a wireless access node of a radio access network (RAN) that communicates over a radio interface with a wireless terminal, the wireless access node comprising: transmitter circuitry configured to transmit, to the wireless terminal, at least one reconfiguration message, the at least one reconfiguration message being configured to facilitate dual connectivity (DC) with a first connection and a second connection; processor circuitry configured to establish the first connection and the second connection with the wireless terminal, the first connection being relayed by a wireless relay node and; receiver circuitry configured to receive a failure information message from the wireless terminal using the second connection, wherein; the failure information message comprises information based on a notification message transmitted from the wireless relay node to the wireless terminal.

In one example, the wireless access node, wherein the notification message indicates that a radio link failure (RLF) is detected between the wireless access node and the wireless relay node.

In one example, the wireless access node, wherein the notification message indicates a failure of a recovery process for an RLF, the RLF having been detected between the wireless access node and the wireless relay node.

In one example, the wireless access node, wherein the notification message is carried via a signal of Backhaul Adaptation Protocol (BAP).

In one example, a method in a radio access network (RAN) that communicates over a radio interface with a wireless terminal, the method comprising: transmitting at least one reconfiguration message, to the wireless terminal, the at least one reconfiguration message being configured to facilitate dual connectivity (DC) with a first connection and a second connection; establishing the first connection and the second connection with the wireless terminal, the first connection being relayed by a wireless relay node and; receiving a failure information message from the wireless terminal using the second connection, wherein; the failure information message comprises information based on a notification message transmitted from the wireless relay node to the wireless terminal.

In one example, the method, wherein the notification message indicates that a radio link failure (RLF) is detected between the wireless access node and the wireless relay node.

In one example, the method, wherein the notification message indicates a failure of a recovery process for an RLF, the RLF having been detected between the wireless access node and the wireless relay node.

In one example, the method, wherein the notification message is carried via a signal of Backhaul Adaptation Protocol (BAP).

In one example, a wireless terminal that communicates over a radio interface with a wireless access node of a radio access network (RAN), the wireless terminal comprising: receiver circuitry configured to receive, from the wireless access node, at least one reconfiguration message, the at least one reconfiguration message being configured to facilitate dual connectivity (DC) with a first connection and a second connection; processor circuitry configured to establish the first connection and the second connection with the wireless access node, the first connection being relayed by a wireless relay node; receiver circuitry configured to receive a notification message from the wireless relay node, and; transmitter circuitry configured to transmit, based on a reception of the notification message, a failure information message to the wireless access node using the second connection.

In one example, the wireless terminal, wherein the notification message indicates that a radio link failure (RLF) is detected between the wireless access node and the wireless relay node.

In one example, the wireless terminal, wherein the notification message indicates a failure of a recovery process for an RLF, the RLF having been detected between the wireless access node and the wireless relay node.

In one example, the wireless terminal, wherein the notification message is carried via a signal of Backhaul Adaptation Protocol (BAP).

In one example, a method for a wireless terminal that communicates over a radio interface with a wireless access node of a radio access network (RAN), the method comprising: receiving, from the wireless access node, at least one reconfiguration message, the at least one reconfiguration message being configured to facilitate dual connectivity (DC) with a first connection and a second connection; establishing the first connection and the second connection with the wireless access node, the first connection being relayed by a wireless relay node; receiver circuitry configured to receive a notification message from the wireless relay node, and; transmitting, based on a reception of the notification message, a failure information message to the wireless access node using the second connection.

In one example, the method, wherein the notification message indicates that a radio link failure (RLF) is detected between the wireless access node and the wireless relay node.

In one example, the method, wherein the notification message indicates a failure of a recovery process for an RLF, the RLF having been detected between the wireless access node and the wireless relay node.

In one example, the method, wherein the notification message is carried via a signal of Backhaul Adaptation Protocol (BAP).

The invention claimed is:

1. A wireless access node of a radio access network (RAN) that communicates over a radio interface with a wireless terminal, the wireless access node comprising:
transmitter circuitry configured to transmit at least one reconfiguration message to the wireless terminal, the at least one reconfiguration message being configured to facilitate dual connectivity (DC) with a first connection and a second connection;
processor circuitry configured to establish the first connection and the second connection with the wireless terminal, the first connection being relayed by a wireless relay node; and
receiver circuitry configured to receive a failure information message from the wireless terminal via the second connection,
wherein the failure information message comprises information based on a notification message transmitted from the wireless relay node to the wireless terminal.

2. The wireless access node of claim 1, wherein the notification message indicates that a radio link failure (RLF) is detected between the wireless access node and the wireless relay node.

3. The wireless access node of claim 1, wherein the notification message indicates a failure of a recovery process for a radio link failure (RLF) detected between the wireless access node and the wireless relay node.

4. The wireless access node of claim 1, wherein the notification message is carried via a signal of a Backhaul Adaptation Protocol (BAP).

5. A method in a radio access network (RAN) that communicates over a radio interface with a wireless terminal, the method comprising:
transmitting at least one reconfiguration message to the wireless terminal, the at least one reconfiguration message configured to facilitate dual connectivity (DC) with a first connection and a second connection;
establishing the first connection and the second connection with the wireless terminal, the first connection being relayed by a wireless relay node; and
receiving a failure information message from the wireless terminal via the second connection,
wherein the failure information message comprises information based on a notification message transmitted from the wireless relay node to the wireless terminal.

6. The method of claim 5, wherein the notification message indicates that a radio link failure (RLF) is detected between the wireless access node and the wireless relay node.

7. The method of claim 5, wherein the notification message indicates a failure of a recovery process for a radio link failure (RLF) detected between the wireless access node and the wireless relay node.

8. The method of claim 5, wherein the notification message is carried via a signal of a Backhaul Adaptation Protocol (BAP).

9. A wireless terminal that communicates over a radio interface with a wireless access node of a radio access network (RAN), the wireless terminal comprising:
first receiver circuitry configured to receive at least one reconfiguration message from the wireless access node, the at least one reconfiguration message being configured to facilitate dual connectivity (DC) with a first connection and a second connection;
processor circuitry configured to establish the first connection and the second connection with the wireless access node, the first connection being relayed by a wireless relay node;
second receiver circuitry configured to receive a notification message from the wireless relay node; and
transmitter circuitry configured to transmit, based on a reception of the notification message, a failure information message to the wireless access node via the second connection.

10. The wireless terminal of claim 9, wherein the notification message indicates that a radio link failure (RLF) is detected between the wireless access node and the wireless relay node.

11. The wireless terminal of claim 9, wherein the notification message indicates a failure of a recovery process for a radio link failure (RLF) detected between the wireless access node and the wireless relay node.

12. The wireless terminal of claim 9, wherein the notification message is carried via a signal of a Backhaul Adaptation Protocol (BAP).

\* \* \* \* \*